(12) United States Patent
Eliasson et al.

(10) Patent No.: US 7,435,940 B2
(45) Date of Patent: Oct. 14, 2008

(54) SYSTEM AND A METHOD OF DETERMINING THE POSITION OF A RADIATION EMITTING ELEMENT

(75) Inventors: Jonas Ove Philip Eliasson, Copenhagen (DK); Jen Wagenblast Stubbe Østergaard, Lejre (DK)

(73) Assignee: Flatfrog Laboratories AB, Lund (SE)

( * ) Notice: Subject to any disclaimer, the term of this patent is extended or adjusted under 35 U.S.C. 154(b) by 206 days.

(21) Appl. No.: 10/548,664

(22) PCT Filed: Mar. 12, 2004

(86) PCT No.: PCT/DK2004/000165

§ 371 (c)(1),
(2), (4) Date: May 31, 2006

(87) PCT Pub. No.: WO2004/081502

PCT Pub. Date: Sep. 23, 2004

(65) Prior Publication Data

US 2006/0255248 A1    Nov. 16, 2006

(30) Foreign Application Priority Data

Mar. 12, 2003    (WO) ............... PCT/DK03/00155

(51) Int. Cl.
*G06F 3/033* (2006.01)
*G06F 3/042* (2006.01)
*G06M 7/00* (2006.01)

(52) U.S. Cl. ............... 250/221; 345/175; 345/176
(58) Field of Classification Search ............... 250/221, 250/222.1; 345/173, 175, 176; 178/18.09
See application file for complete search history.

(56) References Cited

U.S. PATENT DOCUMENTS 3,440,426 A    4/1969    Bush (Continued)

FOREIGN PATENT DOCUMENTS

DE        3 511 330        10/1986

(Continued)

OTHER PUBLICATIONS

Joseph A. Paradiso, "Several Sensor Approaches that Retrofit Large Surfaces for Interactivity," ACM Ubicomp 2002 Workshop on Collaboration with Interactive Walls and Tables, Gothenburg, Sweden, Sep. 29, 2002.

(Continued)

*Primary Examiner*—John R Lee
(74) *Attorney, Agent, or Firm*—Harness, Dickey & Pierce, P.L.C.

(57) ABSTRACT

A method and a system, such as a touch pad, for determining the position of a radiation emitter, which radiation emitter may be an actively radiation emitting stylus, pen, pointer, or the like or may be a passive, radiation scattering/reflecting/diffusing element, such as a pen, pointer, or a finger of an operator. The radiation is modulated by a bar code element and provided onto an at least one-dimensional detector. From the output of the detector, the position of the radiation emitter is determined. This system may be used as a standard touch pad or for determining the position of emitters external thereto, such as a marker used on a wall or black/white board or may be used with "internal" positions such as a touch pad.

44 Claims, 13 Drawing Sheets

U.S. PATENT DOCUMENTS

| | | | |
|---|---|---|---|
| 4,254,407 A | 3/1981 | Tipon | |
| 4,346,376 A | 8/1982 | Mallos | |
| 4,484,179 A | 11/1984 | Kasday | |
| 4,550,250 A | 10/1985 | Mueller et al. | |
| 4,688,933 A | 8/1987 | Lapeyre | |
| 4,688,993 A | 8/1987 | Ferris et al. | |
| 4,692,809 A | 9/1987 | Beining et al. | |
| 4,710,760 A | 12/1987 | Kasday | |
| 4,772,763 A | 9/1988 | Garwin et al. | |
| 4,812,833 A | 3/1989 | Shimauchi | |
| 4,949,079 A | 8/1990 | Loebner | |
| 5,065,185 A | 11/1991 | Powers et al. | |
| 5,073,770 A | 12/1991 | Lowbner | |
| 5,159,322 A | 10/1992 | Loebner | |
| 5,166,668 A | 11/1992 | Aoyagi | |
| 5,227,622 A | 7/1993 | Suzuki | |
| 5,254,407 A | 10/1993 | Sergerie et al. | |
| 5,484,966 A | 1/1996 | Segen | |
| 5,499,098 A | 3/1996 | Ogawa | |
| 5,502,568 A | 3/1996 | Ogawa et al. | |
| 5,679,930 A | 10/1997 | Katsurahira | |
| 5,688,933 A | 11/1997 | Evans et al. | |
| 5,945,981 A | 8/1999 | Paull et al. | |
| 6,061,177 A | 5/2000 | Fujimoto | |
| 6,122,394 A | 9/2000 | Neukermans et al. | |
| 6,141,104 A | 10/2000 | Schulz et al. | |
| 6,172,667 B1 | 1/2001 | Sayag | |
| 6,333,735 B1 | 12/2001 | Anvekar | |
| 6,366,276 B1 | 4/2002 | Kunimatsu et al. | |
| 6,504,143 B2 | 1/2003 | Koops et al. | |
| 6,529,327 B1 | 3/2003 | Graindorge | |
| 6,538,644 B1 | 3/2003 | Muraoka | |
| 6,664,498 B2 | 12/2003 | Forsman et al. | |
| 6,707,027 B2 | 3/2004 | Liess et al. | |
| 6,738,051 B2 | 5/2004 | Boyd et al. | |
| 2001/0005004 A1 | 6/2001 | Shiratsuki et al. | |
| 2003/0048257 A1 | 3/2003 | Mattila | |
| 2003/0052257 A1 | 3/2003 | Sumriddetchkajorn | |
| 2003/0137494 A1 | 7/2003 | Tulbert | |
| 2004/0252091 A1 | 12/2004 | Ma et al. | |
| 2007/0034783 A1* | 2/2007 | Eliasson et al. | 250/221 |

FOREIGN PATENT DOCUMENTS

| | | |
|---|---|---|
| DE | 35 11 330 A1 | 10/1986 |
| DE | 689 02 419 | 3/1993 |
| DE | 690 00 920 | 6/1993 |
| DE | 198 09 934 | 9/1999 |
| DE | 100 26 201 | 12/2000 |
| DE | 100 26 201 A1 | 12/2000 |
| EP | 0 298 837 A1 | 1/1989 |
| EP | 1 204 070 A1 | 5/2002 |
| EP | 1 209 554 A1 | 5/2002 |
| FR | 2 172 828 | 2/1972 |
| FR | 2 172 828 | 10/1973 |
| FR | 2 614 711 | 11/1988 |
| FR | 2 617 619 | 1/1989 |
| FR | 2 617 620 | 1/1989 |
| FR | 2 676 275 | 11/1992 |
| GB | 1 380 144 | 1/1975 |
| GB | 1380144 | 1/1975 |
| JP | 58-010232 | 1/1983 |
| JP | 59-202533 | 11/1984 |
| JP | 60 250423 | 12/1985 |
| JP | 61 133430 | 6/1986 |
| JP | 63 143862 | 6/1988 |
| JP | 63 187726 | 8/1988 |
| JP | 03 216719 | 9/1991 |
| JP | 05095777 A2 | 4/1993 |
| JP | 07 036603 | 2/1995 |
| JP | 08-075659 | 3/1996 |
| JP | 8 75659 | 3/1996 |
| JP | 08-149515 | 6/1996 |
| JP | 8 149515 | 6/1996 |
| JP | 09243882 | 9/1997 |
| JP | 11045144 | 2/1999 |
| JP | 11-232025 | 8/1999 |
| JP | 2000-259334 | 2/2000 |
| JP | 2000-172438 | 6/2000 |
| JP | 2000-293311 | 10/2000 |
| WO | WO 02/077915 | 10/2002 |
| WO | WO 02/095668 | 11/2002 |
| WO | WO 03/076870 | 9/2003 |

OTHER PUBLICATIONS

International Search Reports (PCT/ISA/210 & PCT/ISA/220) & International Preliminary Examination Reports (PCT/IPEA/409 & PCT/IPEA/416).

* cited by examiner

SYSTEM AND A METHOD OF DETERMINING THE POSITION OF A RADIATION EMITTING ELEMENT

FIELD OF THE INVENTION

Example embodiments relate to a method and a system for determining the position of a radiation emitting element and, in particular, a touch pad for use with active or inactive light emitters.

BACKGROUND

Touch pads in general are described in e.g. U.S. Pat. Nos. 4,346,376, 4,484,179, 4,688,933, 5,945,981, 6,538,644, 5,679,930, 4,710,760, 4,484,179, 5,484,966, 6,172,667, 5,065,185, and 6,122,394, US 2003/0048257 and 2003/0052257, as well as JP 63143862, 08075659, and 08149515.

SUMMARY

Example embodiments provide touch pads which are rugged, cheap, and precise and which may be used both as a standard touch pad and for determining the position of the light emitter outside the system, such as for use on blackboards or shop windows.

Example embodiments relate to a system for determining a position of an element emitting electromagnetic radiation, the system comprising: an at least one-dimensional detector having a row of a plurality of individual elements each being adapted to detect radiation and to provide a corresponding signal, an elongated radiation transforming element adapted to modulate electromagnetic radiation from the emitting element so as to form a modulated radiation intensity pattern on the row of the detector, means for, on the basis of the intensity pattern detected by the detector, determining the position of the emitting element.

In this respect, the emitting element may itself actively emit the radiation (such as from an emitter positioned thereon or therein) or it may passively emit the radiation by reflecting, scattering, or diffusing radiation incident thereon (such as from a radiation emitter external thereto) toward the transforming element.

An at least one-dimensional detector is a detector having a plurality of sensing elements each adapted to provide a separate radiation measurement, where at least part of the sensing elements are positioned at least generally in one direction or dimension, normally along a row or line. Two-dimensional detectors will normally have a matrix of sensing elements, a number of which will constitute a one-dimensional detector. These sensing elements may be used for the present invention and the others for other purposes, such as for a web cam or the like.

Normally, the detector will have a field of view which is the combined fields of view of all sensing elements, so that all sensing elements are able to detect radiation from all positions within the field of view of the detector.

Preferably, the longitudinal direction of the transforming element and of the one dimension of the detector is present in the same plane.

In the present invention, it is preferred that the modulation of the radiation is a spatial modulation in which the radiation from the emitter obtains a predetermined intensity distribution/pattern along the length of the transforming element.

Also, the elongate element may be formed by a plurality of per se independent or individual means for modulating radiation (lenses, absorbers, pin holes, apertures, wedges, scattering elements, mirrors or a combination thereof), as long as they are positioned so as to provide a modulation, preferably comprising a plurality of intensity peaks, of the radiation on the row.

When an extension of the detector along the one dimension is smaller than the intensity pattern output or generated by the modulating element, only part of the intensity distribution or pattern will be incident on the detector and thereby detected. In that situation, the determining means may be able to determine the position of the emitter on the basis of e.g. knowledge of the intensity pattern generated by the transforming element and on the relative positions between the detector and the transforming element. Thus, preferably, the determining means comprise means for storing information relating to the transforming element, which information is used in the determination of the position.

It is clear that due to there normally being a predetermined distance (and relative positioning) between the detector and the transforming element, a larger part of the intensity pattern will be incident on the detector, the farther the emitter is from the intensity pattern. This may be used, e.g. wherein the determining means are adapted to determine a first value related to a distance, on the detector, between at least two predetermined parts of the intensity pattern and for determining the position of the emitting element on the basis of the first value.

Also or alternative thereto, the determining means could be adapted to determine one or more second value(s) related to a position, on the detector, of one or more predetermined part(s) of the intensity pattern and for determining the position of the emitting element on the basis of the second value(s). The second value(s) may be determined on the basis of knowledge of the transforming element and on the basis of determined positions, on the detector, of predetermined parts of the detected intensity pattern.

In one embodiment, the determining means are adapted to determine a position, on the detector, of one or more of a plurality of predetermined parts of the intensity pattern by:
  identifying a plurality of predetermined parts of the intensity pattern,
  deriving, from the signals from the elements of the detector having detected the individual parts of the intensity pattern, information relating to a shape of the parts of the intensity pattern, and
  deriving the position(s) by fitting the shape information to the parts of the intensity pattern.

Easily determinable parts of the detected intensity pattern are maxima and minima, but also other parts may be determined, such as by fitting a mathematical function or curve to the pattern detected, where after any point in the function/curve may be determined.

In another embodiment, the determining means are adapted to determine a position, on the detector, of one or more of a plurality of predetermined parts of the intensity pattern by:
  identifying a plurality of predetermined parts of the intensity pattern,
  predetermining a shape of each of the parts of the intensity pattern, and
  deriving the position(s) by fitting the predetermined shape to the parts of the intensity pattern.

The predetermined shape may be a shape specific for the signal provided to the detector, via the transforming means, from a given type of emitter (pen, stylus, finger or the like). For example, a finger may provide larger or less well defined peaks than a stylus.

Preferably, the transforming element comprises, along its longitudinal direction, a plurality of means for reflecting/reducing/absorbing/extinguishing incident electromagnetic information and for transmitting electromagnetic information, having the intensity pattern, toward the detector.

In one embodiment, the reflecting/reducing/absorbing/extinguishing means are provided in a periodic pattern along the longitudinal direction.

Even though any manner of providing the pattern (such as one having any number of intensity/absorption levels) may be used, normally, the reflecting/reducing/absorbing/extinguishing means are adapted to at least substantially totally prevent transmission of electromagnetic radiation there through. This gives a pattern, on the detector, with sharper edges and which is easier to detect and model.

Preferably, the transforming element has its longitudinal axis at an angle to an axis of extension of the detecting elements of the detector.

In a specific embodiment, the detector comprises two or more at least one-dimensional detectors and wherein the system comprises an additional transforming element, where electromagnetic radiation transmitted through a first transforming element is incident on one detector and electromagnetic radiation transmitted through a second of the transforming elements is incident on another of the detectors.

Preferably, the two detectors are positioned adjacent to and on top of each other. The same is the situation for the two transforming means.

In this embodiment, the signals from the two transforming elements may be detected by both detectors and then mathematically separated, or, which is preferred, the first transforming element is adapted to provide radiation modulated thereby with a first characteristic, wherein the second transforming element is adapted to provide radiation modulated thereby with a second characteristic, where a first of the detectors is able to detect radiation having the first characteristic and not radiation having the second characteristic, and wherein a second of the detectors is able to detect radiation having the second characteristic and not radiation having the first characteristic.

In one particular embodiment, the detector comprises a number of co-extending rows of individual elements, and wherein the elongated element comprises means for providing a plurality of radiation lines or oblong radiation spots/peaks across the plurality of rows, the radiation lines having a non-perpendicular angle to a direction of the rows. An elongated element of this type may comprise a number of elongate apertures (or the like) providing the elongate radiation lines. If the elongate element is present in e.g. a plane, the direction of the elongate apertures may be in a direction out of the plane—a direction different from perpendicular to the plane.

When providing the lines not perpendicularly to the rows of the detector, the individual elements of the individual rows will detect the lines differently, which will increase the precision of determining e.g. a maximum or position of the radiation lines on the detector.

A desired embodiment comprises a second elongated element positioned between the elongated element and the emitting element and being adapted to form a modulated intensity pattern on the elongated element, the elongated element further modulating the radiation and providing the further modulated radiation on the detector.

In this manner, a moiré pattern may be generated on the detector. The behaviours of a moiré pattern and that of a simpler bar code or the like are very different. However, both are very suited for the present position determination in that both vary both with a variation in the angle and the distance between the detector and the radiation emitter.

In one situation, the system is adapted to receive radiation from the radiation emitter at a first position or area between the elongated element and the second elongated element and at a second position or area on an opposite side of the second elongated element. Thus, two active areas are obtained, where the radiation in the first position or area is modulated only by a single elongated element and, in the second position or area, it is modulated by the two elongated elements. In this manner, it may be possible to differ between radiation from the two areas and, secondly, the two areas may be used for different types of applications, such as a touch pad and an external drawing pad.

In this embodiment, the elongated element and the second elongated element may be at least substantially straight elements, and a non-zero angle may exist between the elements. This has been found to be very useful in the providing of a reliable position detection.

In a preferred embodiment, the elongated element(s) is/are curved. This provides a number of interesting features in the position determination. Normally, the elongated element(s) is/are curved in a direction away from or toward the detector. If the radiation from the radiation emitter toward the elongated element(s) and the detector is transmitted in a predetermined plane, the curve normally is in that plane. It should be noted, however, that that plane may be bent, such as using mirrors, wedges or the like, with no impact on the functionality.

In fact, both the elongated element and the second elongated element may be curved each having a centre of curvature. Then, when the two centres of curvature are not the same, an increase in precision in the determination of the position may be obtained. Preferably, this difference in position of the centres of curvature is at least 5% of a radius of curvature of one of the elongated elements.

In this embodiment, a number of interesting features are provided when it comprises a lens means positioned between the elongated element(s) and the detector. In fact, one of the elongated element(s) may be provided on a surface of the lens means. In this manner, both a focusing of the radiation on to the detector and a better possibility of triangulating (see below) is obtained.

A large variety of manners exists of providing the elongated elements in the present system. One manner is to have an elongated element provided on a surface of a radiation transparent material inside which the radiation travels at least part of its path from the radiation emitter to the detector. Thus, if the radiation travels in e.g. a plate of a transparent material, the elongated element may be provided on an edge portion of that plate. Thus, when the radiation exits or enters the plate, it is modulated before being provided to the detector or other optical elements.

It has been found that the elongated element may, in fact, be provided simply by printing a predetermined pattern, such as a bar code or a hologram, on the surface. This printing may be with a scattering, absorbing, reflecting material. Also, a material or mask (such as a hologram) may be provided at the surface or fixed thereto. Alternatively, the surface may be altered (from a normally flat shape) in order to form e.g. lenses, wedges or other optical elements thereon in order to generate the desired modulation of the elongate element.

A more classical type of moiré may be obtained when the radiation emitter is adapted to reflect radiation from a radiation provider toward the elongated element, where the radiation provider is adapted to provide spatially modulated radiation toward the radiation emitter. Thus, instead of modulating the radiation from the radiation emitter twice between the radiation emitter and the detector, the radiation may firstly be modulated even before reaching the radiation emitter and then secondly only once between the emitter and the detector.

In a second aspect, the invention relates to a method of determining a position of an element emitting electromagnetic radiation, the method comprising:

modulating part of the emitted radiation in an elongated radiation transforming element, so as to form a modulated radiation intensity pattern, detecting the modulated radiation intensity pattern with an at least one-dimensional detector having a row with a plurality of individual elements each detecting a separate part of the intensity pattern and providing a corresponding signal, determining, on the basis of the intensity pattern detected by the detector, the position of the emitting element.

Preferably, the determining step comprises the steps of determining a first value related to a distance, on the detector, between at least two predetermined parts of the intensity pattern and determining the position of the emitting element on the basis of the first value.

Alternatively or in addition, the determining step may comprise the steps of determining one or more second value(s) related to a position, on the detector, of one or more predetermined part(s) of the intensity pattern and determining the position of the emitting element on the basis of the second value(s).

In one embodiment, the determining step comprises the step of determining a position, on the detector, of one or more of a plurality of predetermined parts of the intensity pattern by:

Identifying a plurality of predetermined parts of the intensity pattern, deriving, from the signals from the elements of the detector having detected the individual parts of the intensity pattern, information relating to a shape of the parts of the intensity pattern, and deriving the position(s) by fitting the shape information to the parts of the intensity pattern.

In another embodiment, the determining step comprises the step of determining a position, on the detector, of one or more of a plurality of predetermined parts of the intensity pattern by:

identifying a plurality of predetermined parts of the intensity pattern, predetermining a shape of the parts of the intensity pattern, and deriving the position(s) by fitting the predetermined shape to the parts of the intensity pattern.

Preferably, the transforming step comprises reflecting/reducing/absorbing/extinguishing electromagnetic radiation incident on the elongated element and transmitting electromagnetic information, having the intensity pattern, toward the detector.

In that situation, the reflecting/reducing/absorbing/extinguishing step could comprise reflecting/reducing/absorbing/extinguishing the radiation using a periodic pattern of one or more radiation reflecting/reducing/absorbing/extinguishing material(s) along the longitudinal direction.

Also, the reflecting/reducing/absorbing/extinguishing step could comprise at least substantially totally preventing transmission of electromagnetic radiation through the elongated elements at one or more positions along the longitudinal direction thereof, and the transforming element preferably has its longitudinal axis at an angle to an axis of extension of the detecting elements of the detector.

An alternative to the absorption/scattering or the like of the radiation, the radiation may be altered by the elongated element having a number of lenses spatially modulating (but maybe not so any substantial degree reducing or altering) the intensity of the radiation.

In a specific embodiment, the detector comprises two or more at least one-dimensional detectors and an additional transforming element, where the modulation step comprises a first transforming element transmitting modulated electromagnetic radiation on to one detector and a second of the transforming elements transmitting modulated electromagnetic radiation on to another of the detectors.

In that situation, preferably, the first transforming element provides radiation modulated thereby with a first characteristic, wherein the second transforming element provides radiation modulated thereby with a second characteristic, where a first of the detectors detects radiation having the first characteristic and not radiation having the second characteristic, and wherein a second of the detectors detects radiation having the second characteristic and not radiation having the first characteristic.

As mentioned above, the detector may comprise a number of co-extending rows of individual elements, and wherein the modulating step comprises the elongated element providing a plurality of radiation lines or oblong radiation spots/peaks across the plurality of rows, the radiation lines having a non-perpendicular angle to a direction of the rows.

Also, the modulating step could further comprise a second elongated element modulating the radiation from the radiation emitter and providing the modulated radiation on the elongated element, the elongated element further modulating the radiation and providing the further modulated radiation on the detector. In that manner, a moiré type modulation may be obtained.

In that situation, the method may comprise the step of receiving radiation from the radiation emitter at a first position or area between the elongated element and the second elongated element and the step of receiving radiation from a second position or area on an opposite side of the second elongated element. Thus two areas may be active either one at the time or at the same time. The radiation from the first area is modulated only by a single elongated element and the other with both, whereby it may be possible to differ between radiation received solely on that basis.

Then, the elongated element and the second elongated element could be at least substantially straight elements, and a non-zero angle could exist between the elements.

In general, it may be preferred that the elongated element(s) is/are curved. Normally, the elongated element(s) is/are curved in a direction away from or toward the detector.

In this situation, both the elongated element and the second elongated element may be curved each having a centre of curvature. Then, when the two centres of curvature are not the same, an increase in precision in the determination of the position may be obtained. Preferably, this difference in position of the centres of curvature is at least 5% of a radius of curvature of one of the elongated elements.

Also, a lens means could provide the radiation modulated by the elongated element(s) to the detector. This lens could have a number of functions, and an elongated element could be provided on a surface of the lens means.

When the method comprises the step of the radiation travelling inside a radiation transparent material prior to or subsequent to the modulation by an elongated element, this element could be provided on a surface of the radiation transparent material. Then, the method could further comprise the step of providing the elongated element by printing a predetermined pattern on the surface. Alternatively, the elongated element could be provided by shaping the surface in order to provide lenses/apertures/wedges/mirrors or the like.

Finally, an embodiment is foreseen wherein the radiation emitter reflects radiation from a radiation provider toward the elongated element, where the radiation provider provides spatially modulated radiation toward the radiation emitter. Then, a moiré pattern or modulation may be obtained using a single elongated element.

In general, the technology described in the applicants co-pending applications PCT/DK03/00155 and the applications filed on even date and titled "A system and a method of determining a position of a radiation emitting element" and "A multifunctional 2D-detector".

BRIEF DESCRIPTION OF THE DRAWINGS

In the following, example embodiments will be described with reference to the drawings, wherein:

In FIG. 1, the system 10 comprises a line detector 12, such as a line CCD, a bar code element 14 and a light pen 16 illustrated at two different positions a and b.

DETAILED DESCRIPTION OF EXAMPLE EMBODIMENTS

Figure 1:
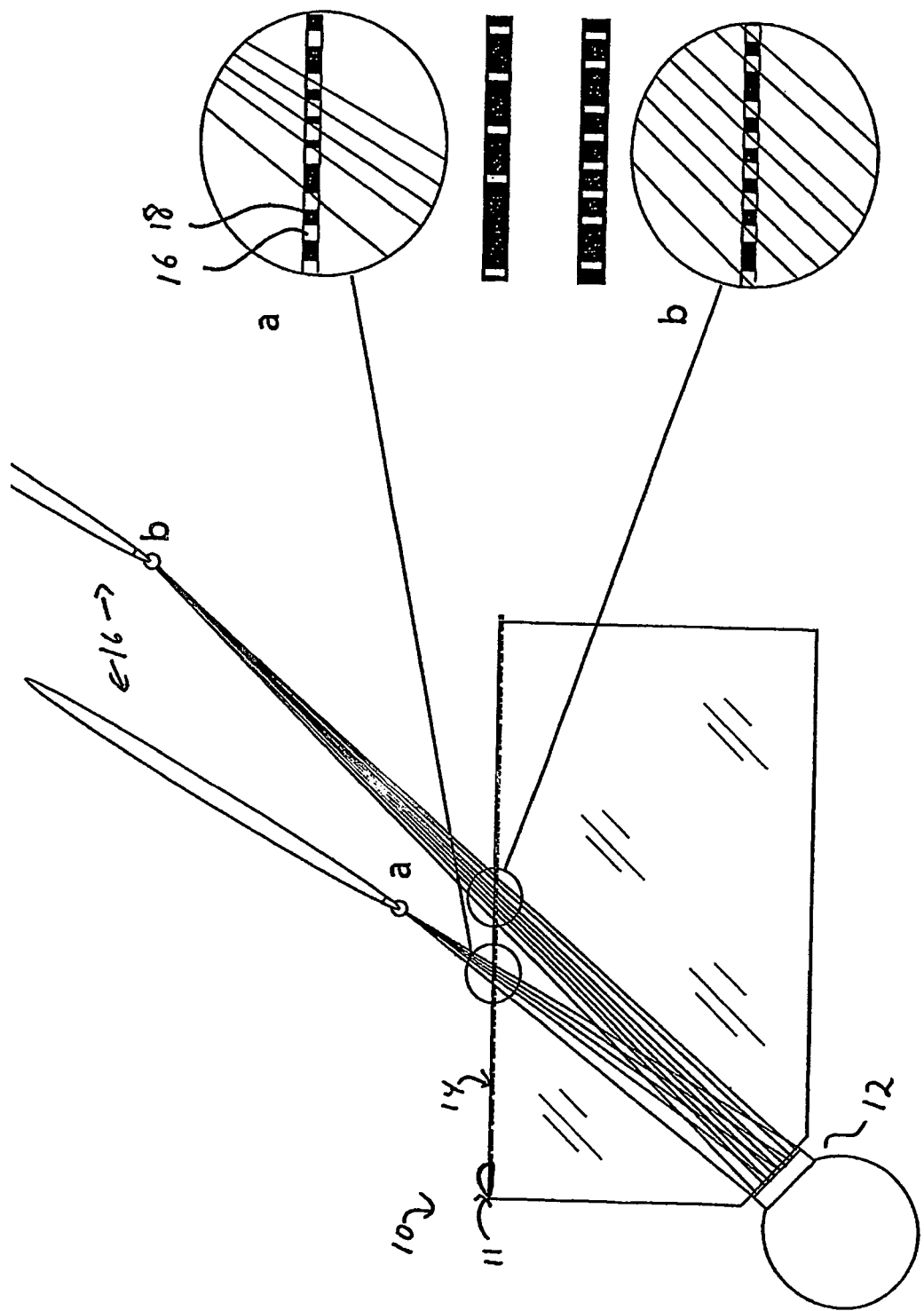
FIG. 1 illustrates the overall functionality of the preferred embodiment.

The bar code element 14 is an element having a number of more or less light attenuating elements in order for it to provide an intensity profile. The bar code element 14 may be adapted to totally absorb/reflect/extinct the light between pairs of parts thereof transmitting light, so as to provide intensity spots on the detector, or it may be adapted to provide a more smooth intensity profile of the light on the detector.

Enlargements are shown of the light penetrating the bar code element 14 from the positions a and b.

The overall functionality is that the light from the positions a or b will obtain an intensity pattern (Illustrated in the two rectangles between the two enlargements) depending on the bar code of element 14 at the position directly between the detector 12 and the position a or b of the emitter 16. Depending on the actual selection of the pattern of the bar code 14, the intensity distribution itself on the detector 12 may identify the direction of the position a or b from the detector 12. The distance between the detector 12 and/or bar code 14 to the position a or b will be determined by the distance between e.g. intensity spots/maxima on the detector 12. A larger distance to the emitter 16 will generate a smaller distance between predetermined parts of the intensity pattern on the detector 12.

In this preferred embodiment, the bar code element 14 is elongated and has a height (direction out of the plane of FIG. 1) sufficient to modulate the light over the full height (in the same direction) of the detector, and the light transmitting parts 16 between the light absorbing/reflecting/extinguishing parts 18 will have the same size/dimension.

In one embodiment, the bar code 14 is, in fact, periodical. In other embodiments, the bar code 14 comprises individual parts along its length, each part being separately identifiable.

It is, e.g. possible to determine the direction of the light, if the bar code 14 is positioned at e.g. a line having a non-zero angle with the line of the CCD. In this manner, the size and/or shape of the individual parts of the intensity pattern will differ with the angle of the incident light with the bar code 14. This is especially easy, if e.g. the openings in the bar code are the same over the full length. Thus, from the shape of the intensity peaks/maxima, the angle may be determined.

The size and/or shape of the parts of the intensity pattern may be determined by assuming that all maxima or tops in the intensity pattern detected are identical (or vary in a known manner so that this variation may be compensated for) and then combining all tops to determine the overall shape of a top. From this combination, the actual e.g. maximum of all tops may be determined even though the resolution of the detector is much lower. The position of the tops may be used for determining both the direction and distance in different schemes.

In another scheme, the shape of the light emitter (the tops) is predefined, whereby this predefined top shape may be used instead of the above top shape determined by the combination of the tops determined.

In order to determine the distance to the light provider, the distance between at least two predetermined parts, such as maxima or minima, should be determinable.

In the embodiment illustrated, an angle of 45° exists between the line of the detector and that of the bar code. This fact that the detector actually sees different opening widths (if all widths are identical in the bar code) may be used to determine the angle from which the radiation or light comes.

It is clear that a given light spot seen through an aperture far away from the detector (to the right on FIG. 1) will provide a smaller spot on the detector than the same light spot seen through an aperture more to the left on FIG. 1.

The variation of the actual spot size from a given light provider may be determined mathematically, and this, compared with the inherent difference also in incident radiation power or intensity in each spot, may be used for, on the basis of one spot, to determine the intensity shape of another spot on the detector.

This may be used in order to facilitate the above methods relating to the use of the shapes of different intensity peaks in order to better determine the position of the intensity maximum. Thus, from one peak, the expected shape of all other peaks may be derived. These peaks may now be added to form the combined peak which may now be re-converted in order to generate the expected peak for each peak detected.

Now, all methods of determining the position may be used, such as a simple triangulation using the two most extreme peaks on the detector.

In one embodiment, a wide angle lens 11 has been added in order to provide a coarse angle indication. This lens is adapted to receive the radiation and to provide it on to the detector. Normally, the lens would be able to see a wide angle but only provide light on to a part of the detector thereby providing only a coarse, low-resolution angle estimate. This is useful if only a few spots are present on the detector or if the bar code has areas providing identical or near identical spots on the detector at two different angular positions.

This wide angle lens may be replaced by an aperture positioned suitably in relation to the detector.

In another embodiment, the bar code element 14 comprises two bar codes positioned in front of each other with a predetermined distance in order for each bar code to individually modulate the radiation (one bar code modulating the radiation from the emitter and the other modulating the radiation from the first bar code). In this manner, a better position determination may be made.

In another embodiment, two line sensors are used in the detector 12—or two lines or line groups may be used in a two-dimensional CCD. In this embodiment, the bar code element 14 may be more liberally positioned and selected or, in fact, two different bar code elements 14 may be used, one element 14 providing an intensity pattern on each line detector or line group.

The one bar code element 14 may, in one embodiment, provide an intensity pattern providing a coarse measurement of the direction, where the other element 14 may then be provided with a bar code providing a finer determination of angle and distance, but which by itself will not be able to determine the angle.

In general, the two line detectors may, as the two or more bar codes, be physically positioned along side (above) each other, and in order to easily separate the signals, corresponding barcode and detector may be provided with optical filters ensuring that the other detector(s) is/are not able to detect this light/radiation.

Figure 3:
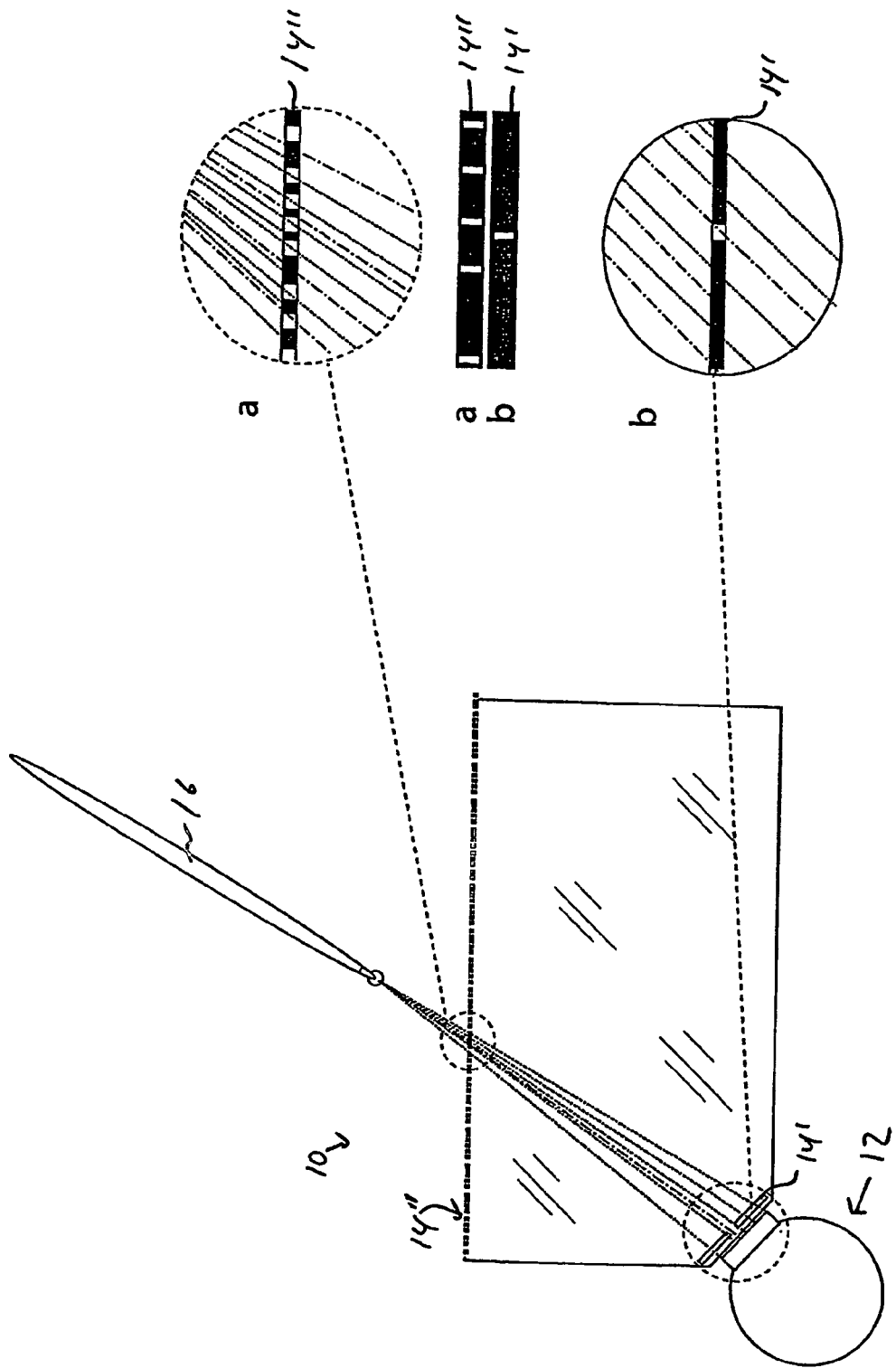
FIG. 3 illustrates the use of a coarse angle measurement.
Figure 4:
FIG. 4 illustrates different bar code designs.
Figure 4:
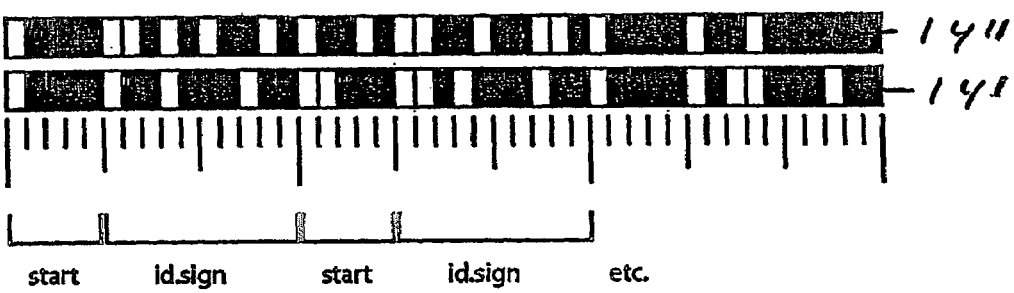
Figure 4:
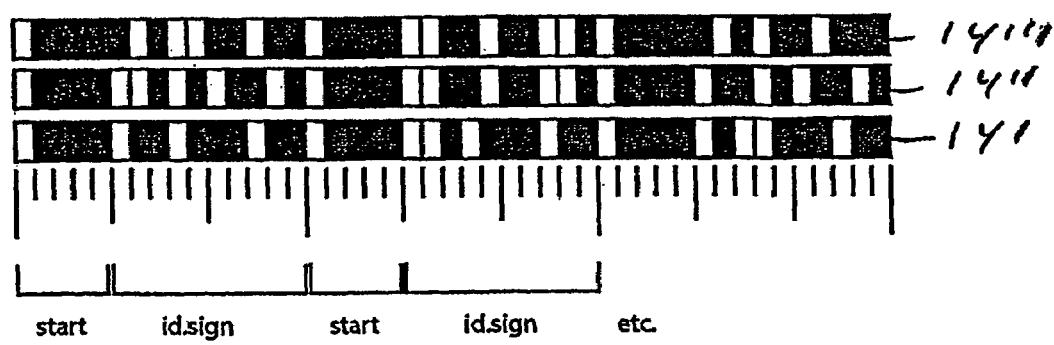

FIG. 3 illustrates a system having two bar codes 14' and 14" positioned above one another and each providing light to two detecting lines (also positioned above each other). The bar codes and detectors may be provided with optical filters in order to prevent interference from the others.

The bar code 14" has a number of apertures or transmissive parts, whereby a pattern having a number of peaks is detected by the pertaining detector.

The bar code 14' has only a single aperture and is positioned much closer to the detector 12. This aperture provides a single peak providing a signal relating only to the angle from which the pen 16 emits the light.

Thus, even if the bar code 14" has a pattern with which identical patterns may be seen on the detector when the pen 16 is positioned at one of a number of positions, the position may be determined as long as those positions have different angles.

Figure 2:
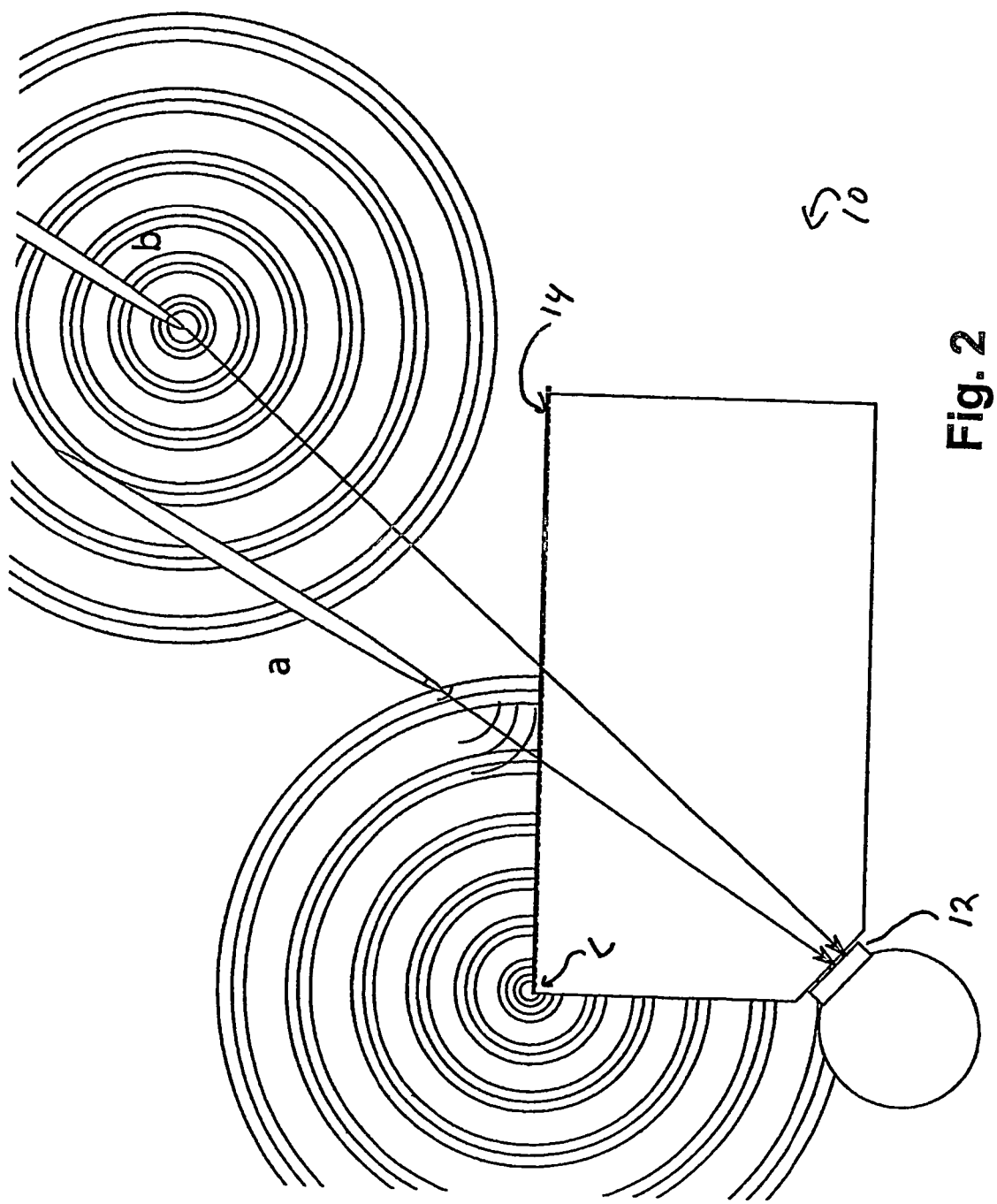
FIG. 2 illustrates the use of active or inactive light providers.

FIG. 2 illustrates that the present invention is indifferent as to whether an active pen b is used or whether an inactive pen a is used together with a light source c. Naturally, the pen a needs not be a pen but may just as well be any other reflecting or scattering element or object, such as a finger. The interaction of the light source c and the detector may, however, be made even more intelligent in that, as is clear, the pen a and b may actually exist outside the system and in positions where ambient light exists which may interfere with the determinations. This may be counteracted by e.g. pulsating the light emitter (pen b or emitter c) in order to better be able to determine which of the detected radiation stems from the pen or from the surroundings. Having the light emitter c connected to (which is preferred but not at all required) the system and the detector or the electronics controlling the detector, a synchronization between the detector and the light emitter is easier.

In general, it is clear that the larger the light/radiation emitting portion (such as the tip of radiation provider a or b), the larger the distance may be between the apertures of the barcode. If a too small aperture distance was used, the pattern on the detector will be more difficult to de-code, if the light provider emits the radiation from a large area.

Naturally, the present embodiments are indifferent as to wavelength of the radiation. Normally, visible light, IR radiation, or NIR radiation can be used, but also UV radiation will be suitable according to the invention.

Also, in the present embodiments, it is clear that the radiation travelling between the light emitter and the detector may travel fully or partly in free space or in a radiation transmissive element. It may be desired to fixedly position the detector and bar code by providing these elements on or in a solid element. Also, it may be desired to have the light provided in a touch pad where light from a light provider is emitted into a light transmissive element guiding the light toward the bar code and possibly also toward the detector.

This solid element may, in fact, be used as a monitor or screen in order to provide interactiveness with e.g. a computer or the like.

The light/radiation provider may be a light/radiation emitting element (such as a radiation emitting pen, stylus, marker, pointer or the like) or a reflecting/scattering/diffusing element (such as a pen, stylus, marker, pointer, finger or the like) reflecting/scattering/diffusing radiation from a radiation source and toward the bar code.

The bar code may be made so as to provide a binarized intensity pattern (fully absorbing/reflecting) and as transmissive as possible, or a pattern may be chosen which provides a more softly varying intensity distribution.

The detector may be a single chip having the one or more rows of detectors or may be prepared by combining a number of individual detectors.

The determining means may be any type of processor, such as software programmable, hardwired, a PC, or a mainframe, and it may use any known type of storage (RAM, ROM, PROM, EPROM, EEPROM, hard disc, floppy disc, optical storage media, or tape) and it may be connected to other processors (such as via the Internet or via wireless connections) in order to have calculations or the like performed at other sites.

Naturally, the determining means may be used for other purposes, such as for illustrating on a monitor or screen, such as one underlying the positions where the radiation emitter is, the signs, curves, characters drawn with the emitter or icons, desk tops or the like pointed at (selected, e.g.) by the emitter (where the emitter may be adapted to be turned on and off by the operator so that a light "blip" from the emitter may signal to the processor that a predetermined action relating to this particular position should be activated). Thus, the determining means may be used for tracking the positions in order to draw curves or in order to, for each new position determined, to evaluate the correctness of the position in relation to the curve drawn (so as to discard obviously erroneous positions).

The present invention is very useful for use in a touch pad and for other applications where e.g. a pen or the like is to be tracked. However, the functionality is very useful in a wide variety of other applications.

One such application is a distance estimation where a small built in laser LED (in the UV/IR/NIR/visible spectrum) projects a bright dot on to an exterior object in a colour that can be detected by sensor, such as in the area outside the system. Then, the distance and angle to the dot can be established. Both the distance and the direction can be read out on the screen. This feature can be used to help users to access distances roughly without tedious measurements procedures. Any kind of object with suitable reflective properties can be measured and the high precision measurement in a small form factor makes the invention highly versatile. One field of appliance could be traffic where safety could be increased using automatic distance measurement. In order to decrease the risk of injuring innocent by passers eyesight with laser beams the built in laser can be pulsed in very short cycles with long periods between. This will provide sufficient light information without light levels with potentially damaging intensity. Other fields of application could be associated with industrial processes, building, handy work and anywhere else where distance measurement frequently is important.

In the following, a basic description of an aperture array 2d positioning system is given:

The light from a single point of touch passes through the apertures and form dots on the image sensor. Each dot is thus a representation of the same point of touch seen from a slightly different angle and distributed slightly different over different pixels. This redundant information can be used to fine-tune the image.

This is done by establishing which part of the barcode has been depicted as dots on the sensor and which dot corresponds to which aperture, which defines the angle from each dot to the point of touch.

The dots will form a light intensity curve with a centre peak and sidewalls with falling intensity because the centre of the dot will receive light from all angles of the point of touch, whereas the left side of the dot will progressively receive light from the right side of the point of touch and the right side vice versa will progressively receive light from the left side of the point of touch.

The dots are slightly distorted according to the light incident angle. The higher angle, the more will the dot be stretched so the side of a dot that is most angular to the sensor. The most angular dots will receive less light due to reflection on the sensor. The distortions and light intensity phenomena can be evened mathematically by compressing the curves and by adding intensity so they all match a dot created at the centre of the sensor as response to a point of touch with an incident light at 90 degrees.

This process will result in a number of dots with nearly the same curve. The pixels that have depicted the dot curves will however be compressed and so form dot images with higher resolution.

An idealised curve can be formed using information from all the curves clearing out noise that distort the ideal Gaussian curve which should be represented on the sensor.

The top of each dot curve can be interpolated by identifying for instance the high peak pixel and the pixels to the left and right and then do a percentage distribution of 17%/60%/23% in order to find the actual midpoint of the point of touch through the following equation. It is understood that any which number of pixels on either side of the peak pixel can be part of the percentage distribution.

$(-1*(17-23/2))+50=53$ meaning that the centre point of the dot and the aperture and the point of touch are aligned. In this way, a single pixel can be subdivided into 100 times more resolution. The resolution uncertainty is of course linked to the S/N ratio of the system.

All the dots on the sensor point to the point of touch and they can be joined in an analysis to find the most likely centre point of the point of touch. The two dots at the far end of the sensor provide the best basis for a triangulation and can establish a resolution point around the point of touch. This resolution point will be more and more elongated with increased distance to the sensor.

When the resolution point is established, the width of the point of touch can be calculated as a function of the near peak pixel intensity distribution. The broader the point of touch is the broader will the dot on the sensor be at a given distance from the sensor. Broad points of touch or very near-by points of touch will result in dot curve overlaps. In this situation, the near peak pixel intensity is used to model the dots intensity curve even out in the area with overlap. Furthermore due to the barcode modulation there will always be two dots that are spaced further apart than any of the other dots and therefore have a minimum overlap. This information is processed to establish what the width of the point of touch is.

The width of the touch is used to further refine the position detection. A point of touch cannot be broader than the resolution point. Thus, a broader point of touch will create a field of several resolution points, until it fits into the centre. Put another way: only tiny points of touch can be hard to establish within a resolution point.

Even though a point of touch is so small that it can fit into one resolution point, a high resolution can be derived by creating a vector of the movement of the point of touch. Every measurement will place the point of touch in one resolution point. All these resolution points are distributed along a vector that projects the speed and direction of the point of touch movement. The vector is formed as a mean value of all measurements, and knowledge of the users typical movement style is used to dismiss odd measurement that do not fit with the vector. A high number of updates will provide more information to form the vector.

In one embodiment, the software can incorporate a corrective means that discovers reoccurring odd measurements and establishes how much the odd measurement is out of line with the vector movement. This difference is stored in a memory so the system can increase its accuracy through dynamic calibration. These imperfections are associated with imperfections in either the light transmissive means, the barcode or the sensor, but in any case, they can be compensated for through dynamic calibration. The principle for the dynamic calibration can be similar to the neural network principles that use correlated data to do iterative corrections over and over again as the system learns. Matlab has the basic neural network tools and can output algorithms for programming FPGA, DSP or CPU.

The vector can be used to link points of touch that are too close to the sensor to form enough dots on the sensor to establish the barcode, if the point of touch comes from or continues to an area where there is enough dots to identify the barcode. This is done by seeing which part of the sufficient barcode identification pattern that remains in view or respectively was seen as a part of a barcode identification pattern that came into view.

As long as the vector connects to a previous or re-established barcode identification pattern, only at least two apertures are needed to create dots on the sensor in order to do a triangulation.

Figure 5:
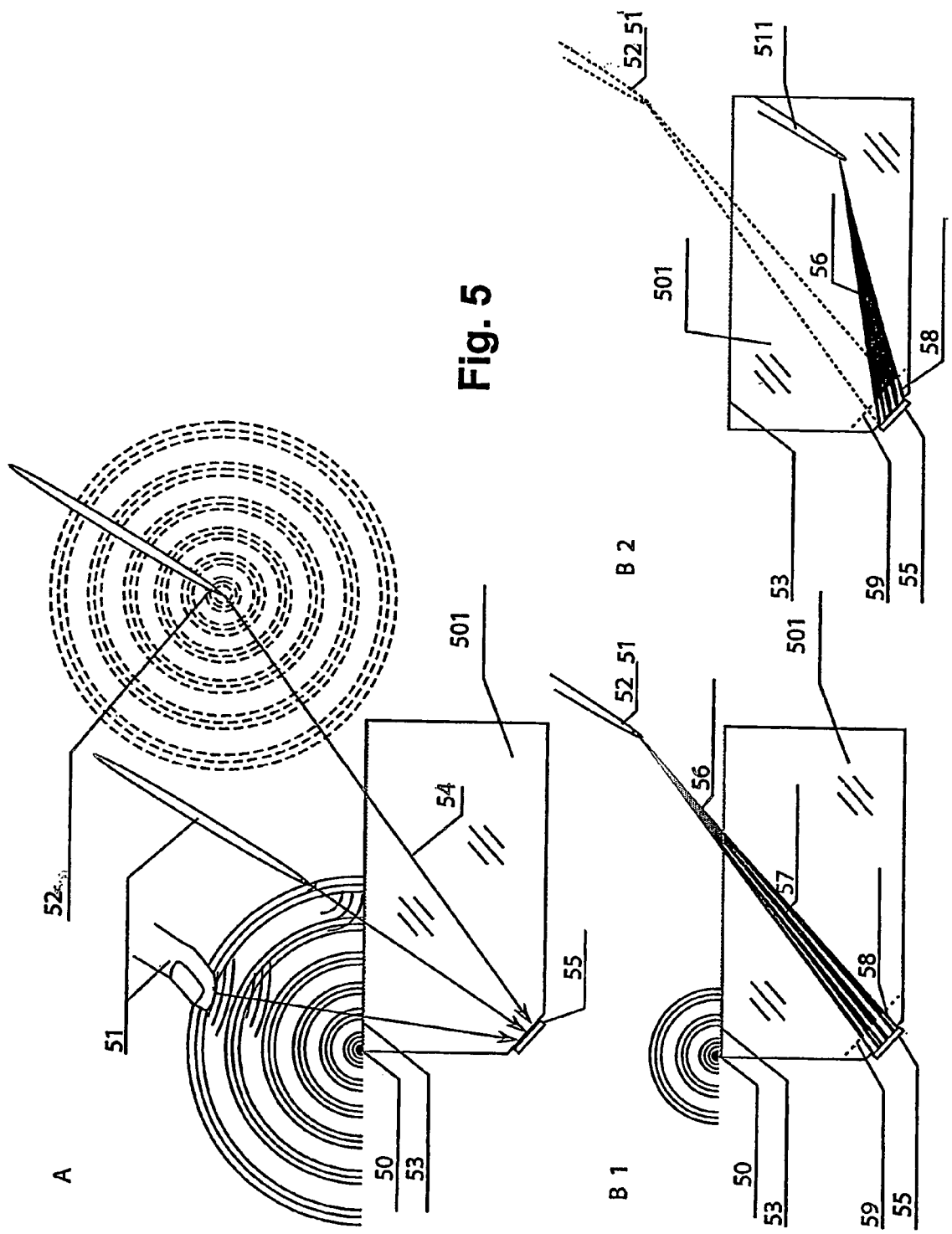
FIG. 5 illustrates different embodiments of internal and external emitters.

Passive/Active Exterior Touch Barcode FIG. 5A

The description is relating to a system with an internal and external touch functionality. E.g. an electronic device with a screen which functions as a touch screen, and with capabilities of registering input from outside the device, this input could for instance be written text, or just ordinary touch input, where the system registers the event and the position of a touch by a interfacing object.

To make a system which can interact with passive reflective, scattering objects (51) as well as active light emitting objects (52), a source of light (50) is added to the system.

Also, included is at least one aperture array (53) and at least one 1d light sensor (55), placed on the edge of the plate of transparent material (501) which constitutes the internal touch screen.

A passive reflective, scattering object (51) can be a finger, a pen, a tool, knuckle etc. It is to be understood that any reflective, scattering object can be used to interact with the system.

An integrated light source (50) is modulated to send light out in a laterally widespread angle covering the external passive touch area. The light is distributed in a narrow lateral angle just above and substantially parallel to the plane intended for passive touch.

When passive, reflective objects (51) enter the field of light, light is reflected in all directions. Some of the light (54) will pass through the outer aperture array (53), enter into the screen cover and propagate through the screen cover towards the sensor(s) (55). The light travelling through the first aperture array (53) will be modulated in the lateral plane accordingly to the modulation of the aperture array (53).

The first aperture array (53) can be arranged in a binary barcode with a unique modulation for each angle in relation to the sensor(s), so that the system can determine not only the distance to the object but also the angle to an interacting object (51, 52).

An active, light emitting object (52) may be used, in that it uses the same system without needing a system integrated light source.

Passive/Active Exterior Interior Touch FIG. 5B

This description describes a system where the external and internal touch system uses two different principles of functioning. The external system uses a moiré effect produced by at least two aperture arrays (53, 59) to determine the position of the interactive object (51, 52), whereas the internal screen uses only one aperture array (53).

Such a system can be implemented in small electronic devices where the internal screen (501) is of substantially smaller size than an external touch area, and concordantly has substantially fewer positions of touch that needs to be precisely defined. The signals generated of light modulated by one aperture array is less complicated to analyse than the signals modulated by two, why the system while using the internal screen only, will be less demanding in terms of calculation power needed, while still having the capabilities of enabling high resolution external touch input.

A light emitting object (52) emits light in external touch area. The light 56 is evenly distributed and not modulated in the lateral plane. Some of the light sent out from the pen light (57) will pass through the outer aperture array (53), enter into the screen cover and propagate through the screen cover towards the sensor(s) (55).

After passing through a first aperture array (53) the light will be modulated in the lateral plane accordingly to the modulation of the aperture array (53). The modulated light will propagate in the screen plate (501) some of this light will travel towards the sensor (55).

A second aperture array (59) is positioned in from of the sensor 55. When the modulated light, which has passed through the first aperture array, passes through the second aperture array, it will again be modulated. The light (58) will then be modulated so that a moiré pattern will be projected on the sensor (55).

The double modulation of the image will create a Moiré pattern with a high degree of angle and distance sensitivity enabling the system to establish direction and distance to the light emissive object (51).

It is to be understood that a light reflective, scattering object (52) and a system light source (50) can be used in parallel or combined with a light emissive object.

If, however, an interacting object (511) touches the internal screen, light will be reflected or emitted into the internal screen plate (501). The light is not modulated in the lateral plane. Some of the light will propagate through the plate towards the sensor. Before the light hits the sensor, it will pass through the second aperture array 59. The light travelling through the second aperture array (53) will be modulated in the lateral plane accordingly to the modulation of the aperture array (53). The thus modulated light will create a pattern on the sensor corresponding to which part of the aperture array it has travelled through, from which distance the light comes, and what size the interacting object has.

Thus, the external signals are modulated twice through a first aperture array (53) and second aperture array (59), while the interior signals are single modulated through second aperture array (59).

Figure 6:
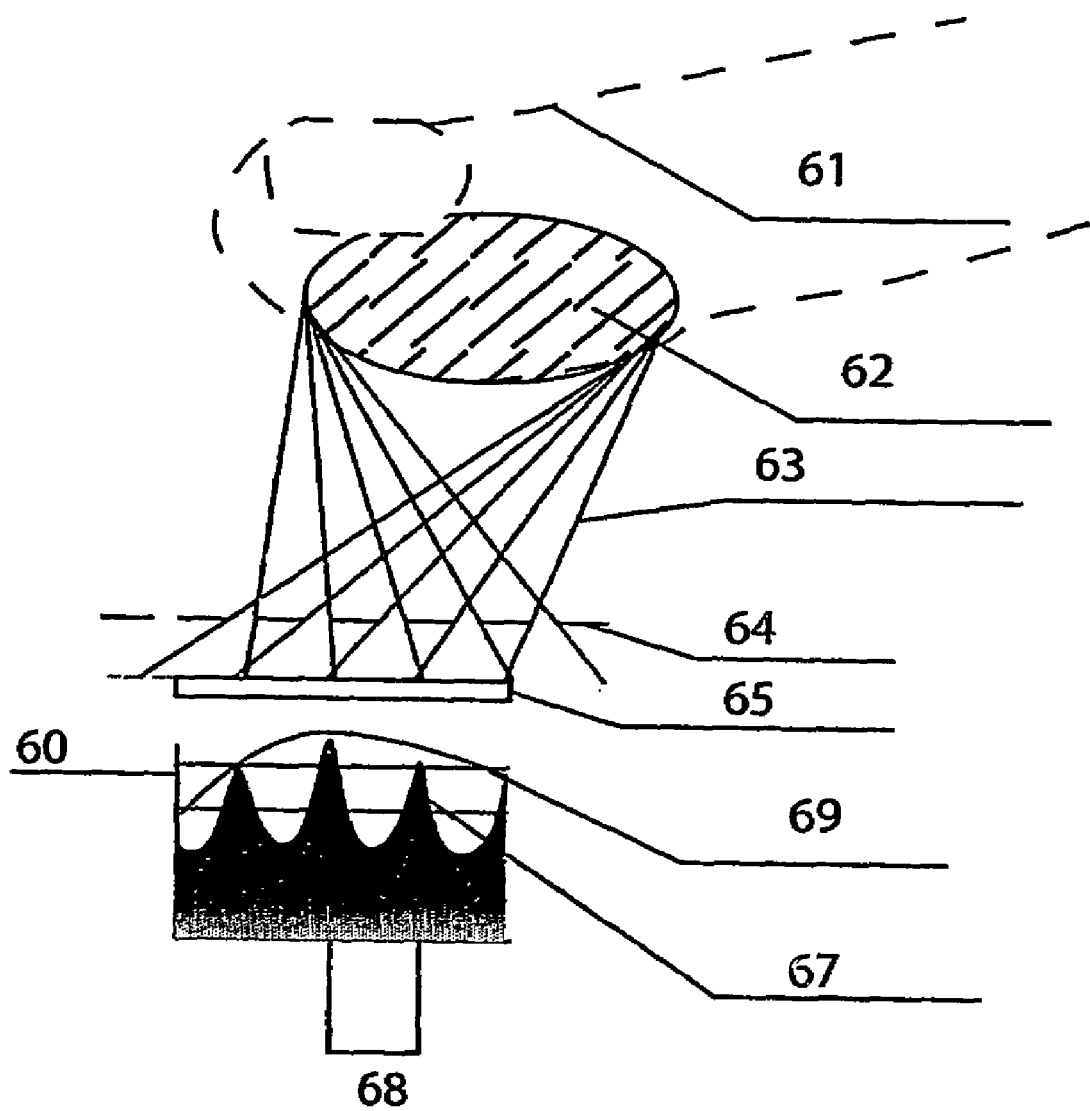
FIG. 6 illustrates how to handle a large emitter.

Big Object Input, FIG. 6

This description relates to the situation of a system consisting of an aperture array (64), a detector (65) and a interacting object (65). The description is specifically concentrating on the situation where the interacting object emits or reflects or scatters a signal which has a great extension in the lateral plane in relation to the distance from the aperture array (64) and/or the detector (65) to be reproduced on the detector according to the numbers of apertures, without creating overlapping representations.

Such a situation is shown in FIG. 6. The interacting object (65) in this case is a finger, but it could also be a pen, knuckle, palm, arm, or a tool of any kind. Some of the light (63) from the interacting object travels towards the detector (65). Before it hits the detector, the light passes a first aperture array (64). This aperture array modulates the light in a lateral plane. Light from the object (62) passing through an aperture, projects a pattern on the detector responding to the size and form of the object, as well as the design of the system and the distance to the object. In FIG. 6, light is projected from the object (62) on the detector (65) through six different apertures (64) thus six images of the object is reproduced on the detector. These projections overlap each other on the detector. The whole detector is therefore covered with light.

The output (66) from the detector will still provide a unique pattern for the position, the pattern will show a peak (67) where two or more images overlap, thereby making it possible to measure the number of overlaps and interval of overlap (69). The interval of the overlap is constituted by the aperture array (64).

Furthermore, the overall light distribution on the detector will describe a Gaussian curve (69), with a maximum reflecting the position of the nearest part of the interacting object (62)

By comparing the known design and position of the aperture array (64) with the output, it is possible to decide the size of, and angle and distance to the interacting object.

Figure 7:
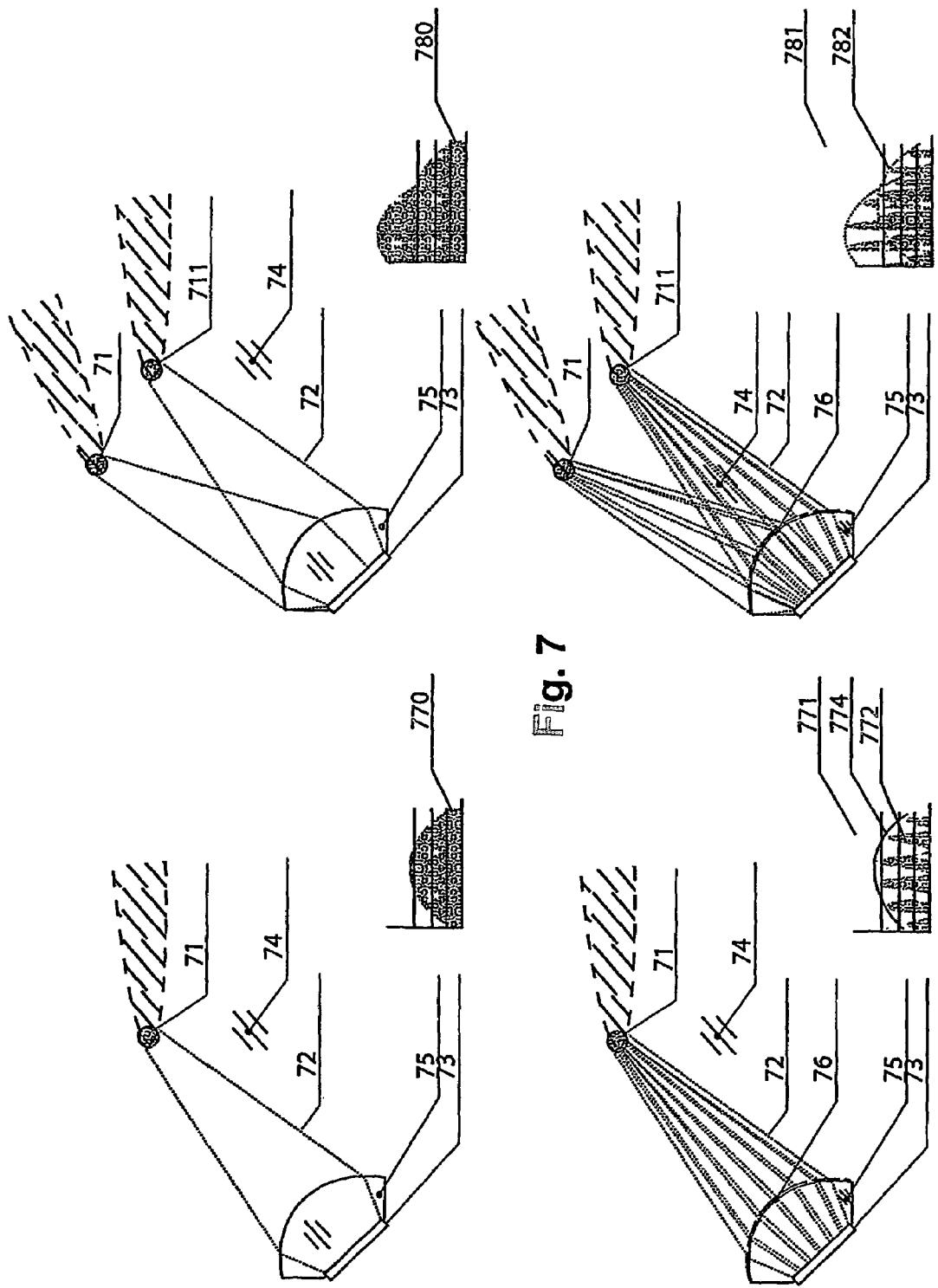
FIG. 7 illustrates the use of an array on the surface of a lens.

Lens Effect Curved Barcode FIG. 7

This description relates to an aperture array (76) that is curved and placed on an object with a curved surface. More specifically, it relates to a system where a first part (75) has a refractive index which is different from the second part (74), where these two parts are in optical contact and where the interface between those parts provides a lens effect.

In the interface of those two parts, an aperture array (75) can be placed. The purpose of this construction is to achieve an optical 2d positioning detection system with a higher efficiency, reliability and precision than a corresponding system not using a lens effect. The lens effect provides the effect of a system having an aperture array and a detector, where the distance between the interfering object, and the detector/aperture array element is virtually made smaller.

The resolution of an optical position detecting system of this type is substantially diminishing with distance between interacting object and sensor, a lens design reducing this effect to a minimum.

In FIG. 7A, a first part (73) is made from a material with a refractive index that is higher than the refractive index of a second part (74). The first part is produced and mounted so that it has optical contact with the second part.

The first part is formed so that it works as a positive lens; e.g. a focusing lens. The first part is either directly or indirectly coupled to a detector (73). The interface between the first part and the second part is curved. If an interacting object (71) is placed on/in the second part, light is reflected, scattered or emitted from the object (71). Light from the object is propagating in the second part toward the sensor.

The light will project a signal on the detector (73), which produces an output corresponding to the form of the object (770). The output intensity curve reflects the angle to the object, the distance, size and form of the object.

In FIG. 7B, an aperture array (76) is applied to the interface between the first and the second material. Some light reflected, scattered or emitted from an interacting object (71), such as a finger or a stylus, propagates through the second material toward the detector (73), when the light passes through the surface between the first material and the second material, it will be diffracted and bent towards the focal point of the interfacing surface between the first and second part.

Some of the light will pass through the aperture array (76). The light travelling through the aperture array (76) will be modulated in the lateral plane according to the modulation of the aperture array (76). The thus modulated light will create a pattern on the detector (73) corresponding to which part of the aperture array it has travelled through, from which distance the light comes and what size the interacting object has.

The output from the detector will show a series of peaks according to the design of the aperture array. Each peak (772) corresponds to the size and shape and distance of the interacting object. Together, the peaks will describe a curve (774) that corresponds to the output curve of a system without an aperture array (770).

The size, peak level, amplitude and overall curve gives multiple data describing the position of an interfering object, and the size of the interfering object.

In such a system, the light incident angle is also increased and thus less distorted. The barcode aperture arrangement is placed on the lens. This increases the resolution because the apertures, which the light has passed, are spaced further apart. The barcode modulation as measured by the detector (73) retains the information from the more spaced apertures for the triangulation process that can be done with a better depth resolution.

FIGS. 7C and 7D illustrate the detector output curves from a system with a first (71) and a second (72) simultaneously interfering objects in different positions.

FIG. 7C illustrates a system without multiple apertures. The output (780) from the detector (73) will consist of a curve that is described as the output curve for the first interacting object (71) and the second interacting object (72) superimposed.

In FIG. 7D, an aperture array is attached to the interfacing surface between the first part (75) and the second part (74). The output from the detector (781) has two orders of peaks modulated in correspondence to the aperture array (76) and the first object (71) and the second object (711). The peaks will describe a curve (782) that corresponds to the curve of a system without an aperture array e.g. as described in 7C (780).

By means of traditional signal processing the two orders of signals can be differentiated, and be used for calculating the position and size of the interacting objects (71,711) in the same manner as described for a single interacting object in relation to FIG. 7B.

Figure 8:
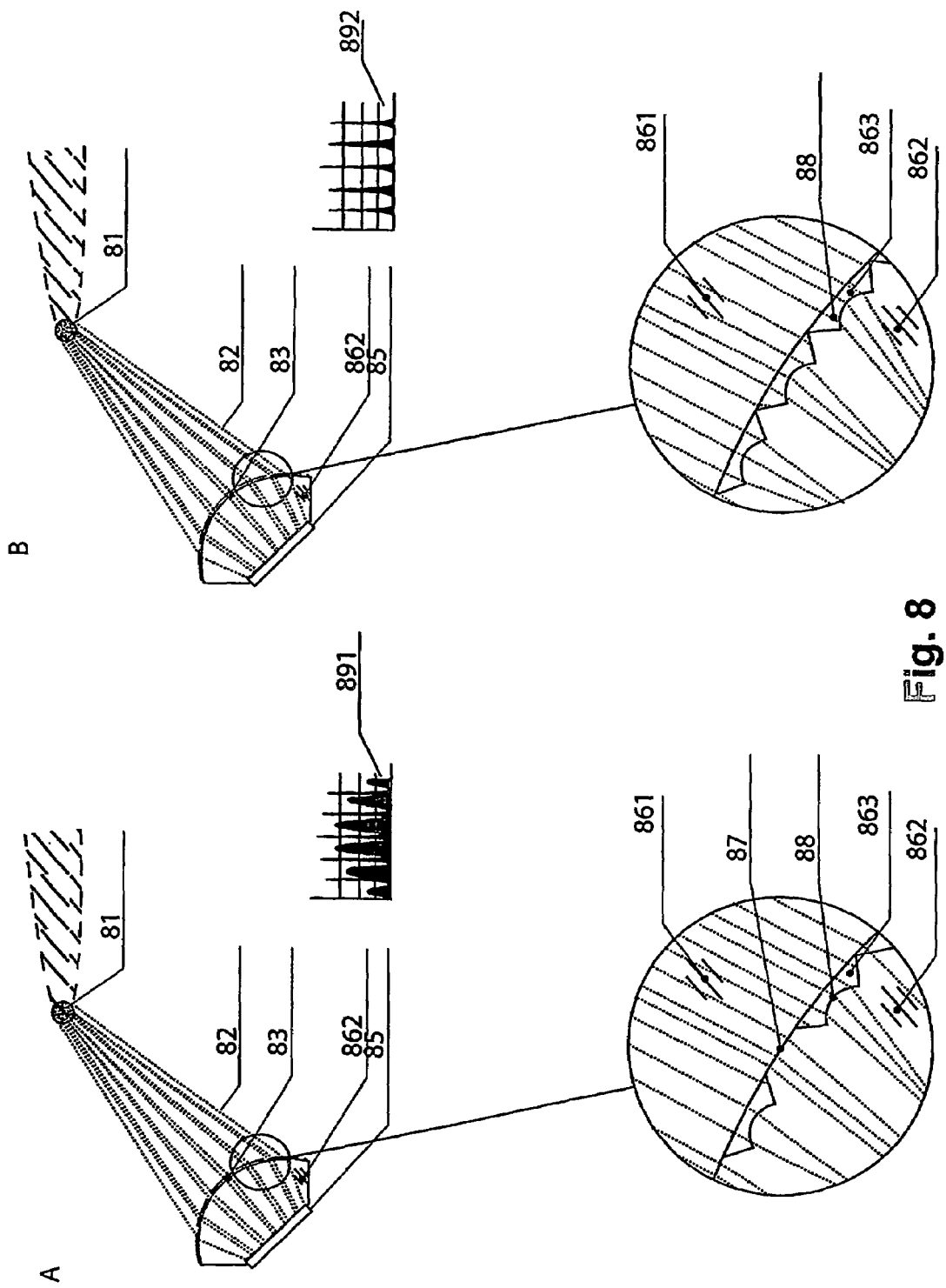
FIG. 8 illustrates the use of lenses on the surface of a lens.

Micro Lens FIG. 8

Alternatively to the barcode on the lens in FIG. 7, the intensity modulating features may instead be transparent lens parts interrupted by micro lenses 88 that concentrate light and shadow on the detector (85) producing a Moiré output (891) that induces great changes according to very slight point of touch movements.

Thus, in addition to the lens effect by the lens 862, which effect it seen by the radiation impinging between the lenses or parts 88, other lenses 88 are provided at the same interface but which may have other characteristics. Thus, the lens 862 may e.g. have a focus point defined behind the sensor in order for incoming radiation to have a relatively broad intensity peak (this may also be the situation in FIG. 7), whereas the lenses 88 may have a focus point closer to the sensor in order for them to provide narrower peaks. Thus, these two types of peaks are easily discernible from each other.

The lenses 88 may provide a intensity pattern on the sensor which is very different from that provided by the lens 862. In addition to this, the lenses 88 provide the effect of a bar code on the lens 862. Thus, two different patterns are provided which each may be used for determining the position and size, whereby an overall increase in the precision is obtained.

In one situation, adjacent lenses 88 may have different focal points or focal distances so that the peaks generated thereby have different widths on the sensor. Thus, from the different widths determined, the distance to the emitter may be estimated, and the direction is determinable from the positions on the detector.

Otherwise, the peaks or intensity pattern generated by the lens 862 will, as is described above, provide an estimate of the position of the emitter. The additional peaks generated by the lenses 88 may be used for a more precise determination of the position.

FIG. 8B illustrates another embodiment where only lenses 88 transmit radiation toward the sensor. The effect of the lens 862 in FIG. 8A has been removed by the lenses 88 abutting.

Again, different focal lengths for the lenses may be used in order to provide a position determination.

Another effect which may be used is the fact that even though two lenses are provided at a predetermined distance, the spots provided thereby on the sensor may have another distance. Thus, a coding in the distances between the lenses may also be used in order to determine the position of the emitter.

Yet another manner is to provide the lenses 88 with different sizes. This is also useful in the position determination.

Naturally, the lenses may have smooth surfaces or may be manufactured as e.g. Fresnell lenses.

The micro lenses can be produced using high refractive materials such as polycarbonate (n=1.6) in combination with a material with lower refractive index such as for instance the light transmissive screen surface material that could be PMMA (n=1.5). The lenses 88 may be provided in the lens 862 by moulding or by subsequently removing part of the material of the lens 862. Also, lenses may be provided by printing a hologram on the lens 862—or by adding a foil with the hologram.

Figure 9:
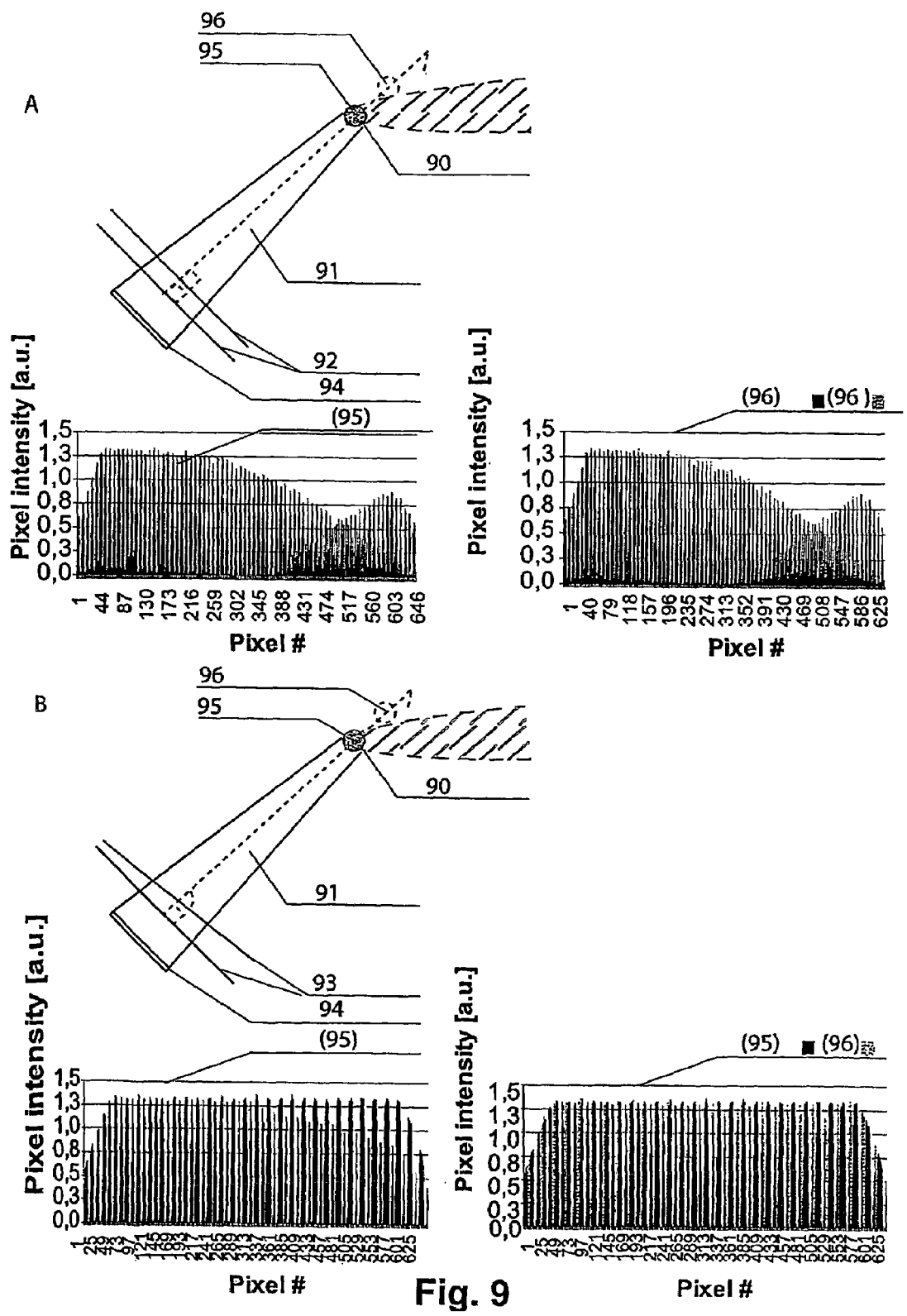
FIG. 9 illustrates the effect of linear, non parallel arrays.

Moiré FIG. 9

The barcode can involve a Moiré pattern that can enhance angle resolution, depth resolution and light sensitivity.

In a basic version the Moiré pattern consist of at least two overlaying aperture arrays (92) that create a modulated intensity pattern on the detector (94). The intensity pattern on the detector changes both with distance and angle, whereby the position of the emitter 90 is determinable.

FIG. 9a illustrates the intensity pattern obtained using two parallel aperture arrays 92 with a mutual distance of 4 mm, with a distance of 10 mm, with a pitch of 0.13 mm and an aperture size of 0.1 mm. The distance from the sensor 94 to the emitter position 95 is 350 mm and the distance to position 96 is 351 mm.

The left intensity pattern relates to position 95 and the right pattern is the pattern obtained when the pattern relating to position 95 and that relating to position 96 are added. It is seen that the two patterns are quite similar.

FIG. 9b relates to a different embodiment, where the aperture arrays 92 are non-parallel.

In this embodiment, the array the closest to the emitter is angled 10 degrees.

Now a large difference is seen in the two patterns which again relate to position 95 and position 95 AND position 96. Thus, it is much easier to perform a precise position determination on the basis of tilted or angled arrays.

The received modulation changes and thus the angle resolution and depth resolution can be increased by non-parallel aperture arrays.

Quite similar to this, two curved arrays which have non-coincident axes of curvature will provide a very different response type which is also interesting in position determination. This is indifferent whether the arrays are arrays of absorbers/reflectors or lenses.

In general, the use of two arrays has the advantage of both increasing the precision in the position determination and providing a higher radiation intensity on the sensor due to the fact that the apertures therein may be larger when two arrays are used to create the modulation.

Figure 10:
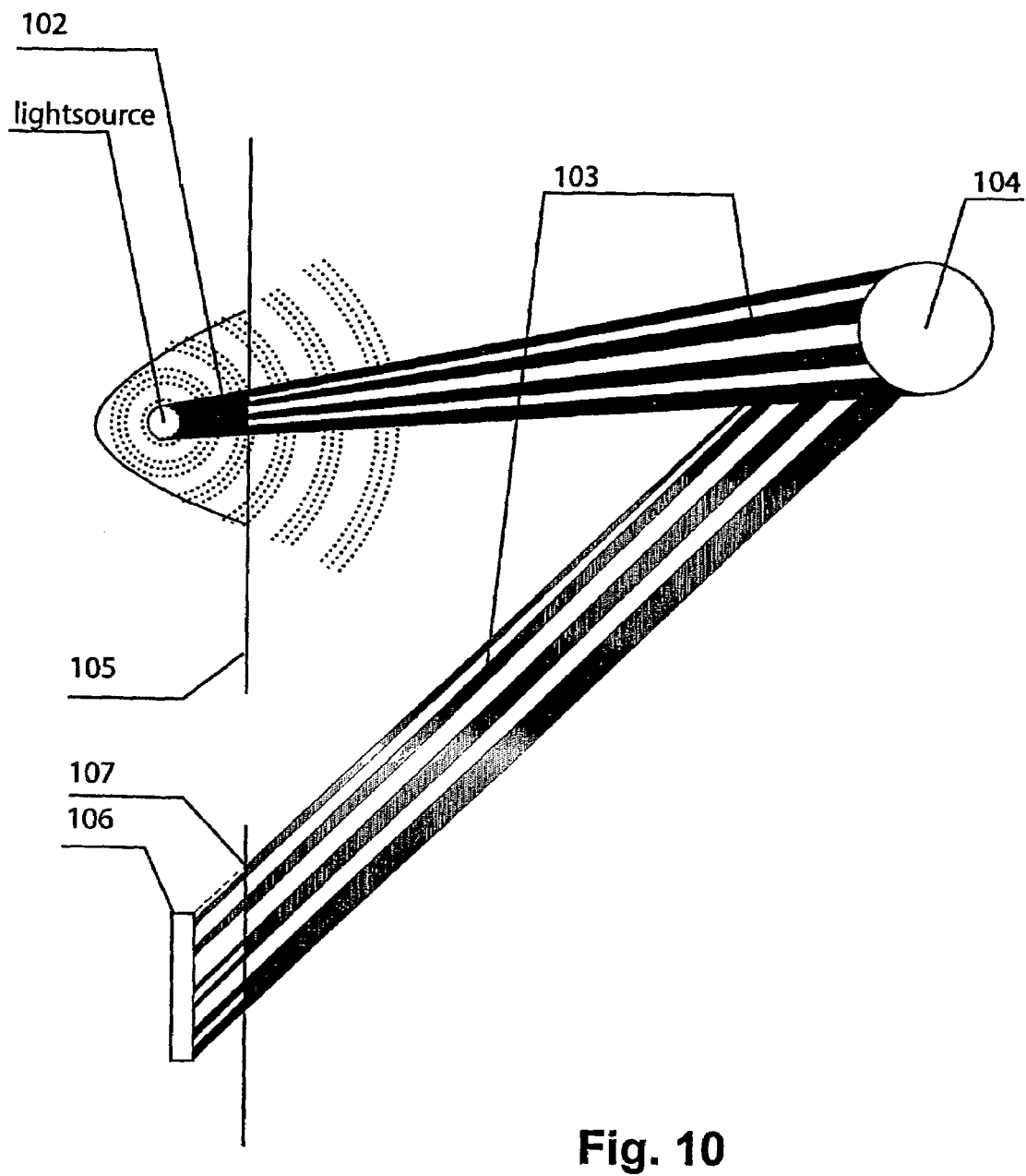
FIG. 10 illustrates

Modulated Light Source Resolution Enhancement FIG. 10

FIG. 10 illustrates another manner of creating the double-modulation using only a single aperture array at the detector.

A light source (101) is modulated when transmitted through an aperture array (107) from which the modulated radiation is transmitted toward the emitter 104. In this embodiment, the emitter simply reflects the radiation toward the other aperture array 105 positioned in front of the sensor 106.

Thus, the radiation detected has been modulated twice.

Naturally, it is desired that the modulated radiation from the array 107 and the size of the emitter 104 make it possible to reflect multiple radiation spots toward the array 105.

Figure 11:
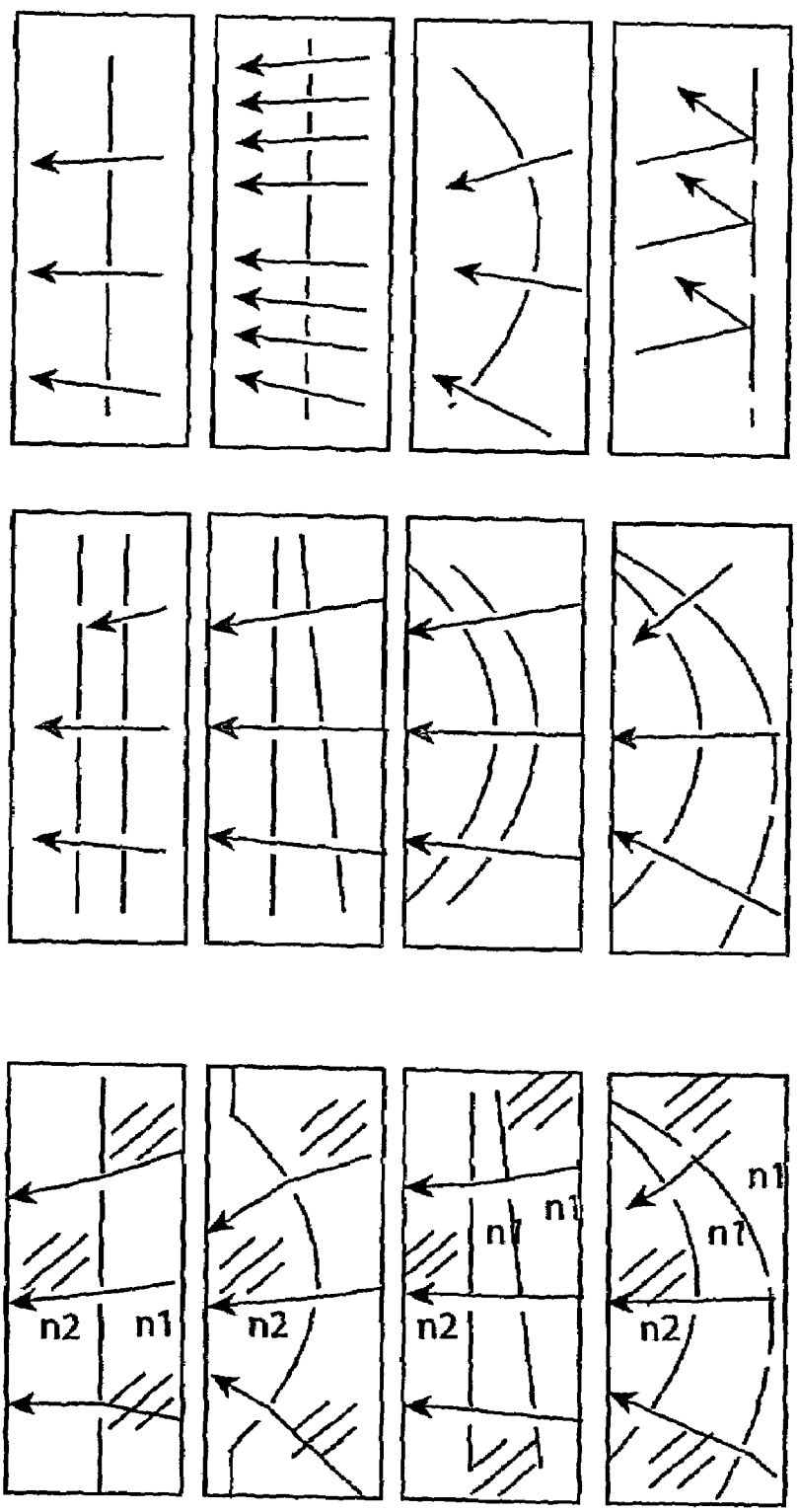
FIG. 11 illustrates

Multiple Slits FIG. 11

FIG. 11 illustrates a large number of different possibilities or combinations of straight/curved arrays of periodic or non-periodic reflecting/absorbing/deflecting/magnifying/de-magnifying elements provided or not provided at an interface with a change in refractive index.

All such combinations are possible and have their own advantages or disadvantages.

Figure 12:
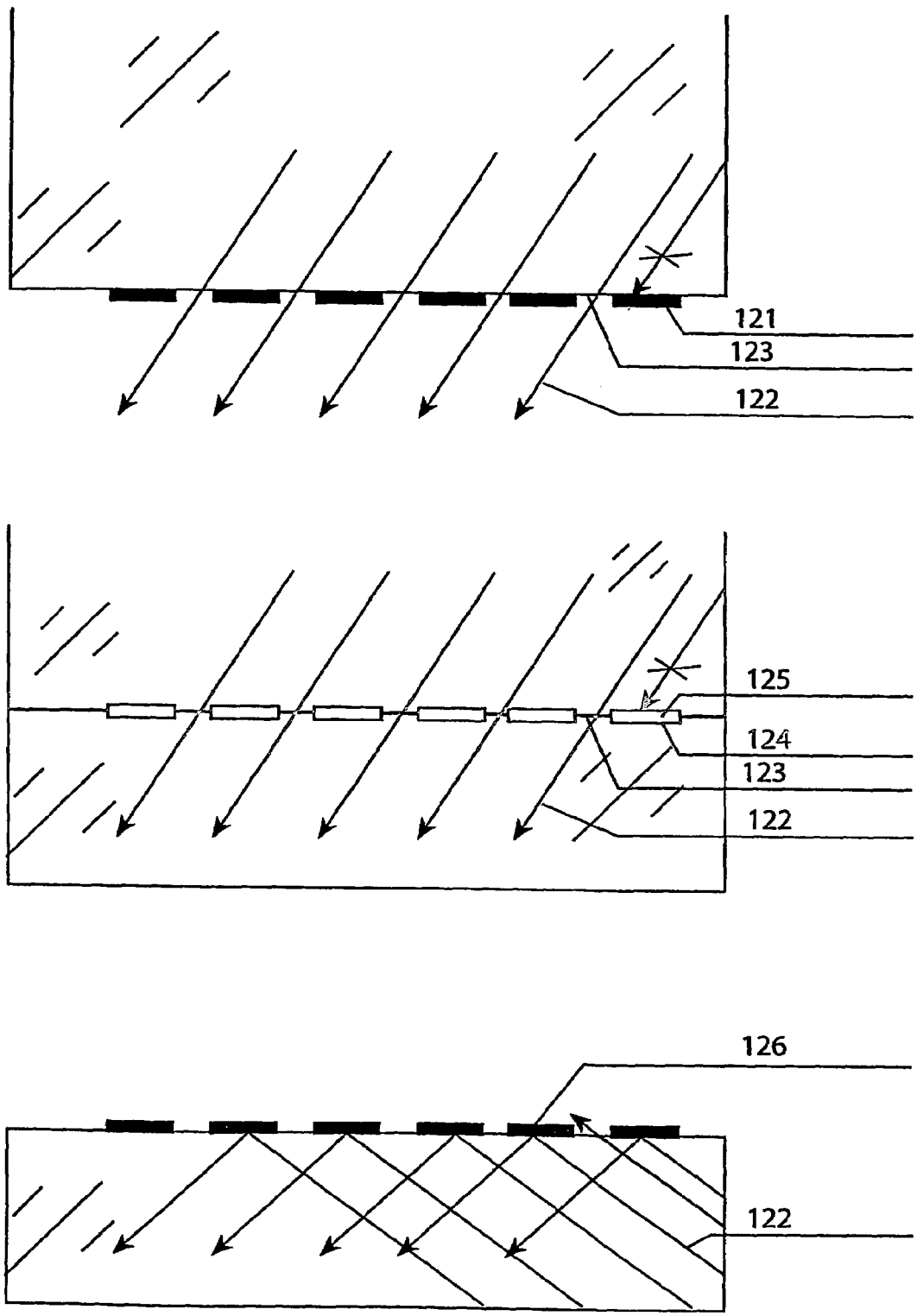
FIG. 12 illustrates different manners of providing the elements of an array.

Different Modes of Producing Apertures FIG. 12

FIG. 12 illustrates different manners of producing the apertures. The individual elements of the arrays may be reflecting/absorbing/deflecting/magnifying/de-magnifying, and combinations thereof may exist in an array.

The elements may be provided on a surface of a material as a film or as a print, or they may be provided as removed parts of the material of the surface (such as forming lenses). Also it is possible to provide the elements on the surface.

Figure 13:
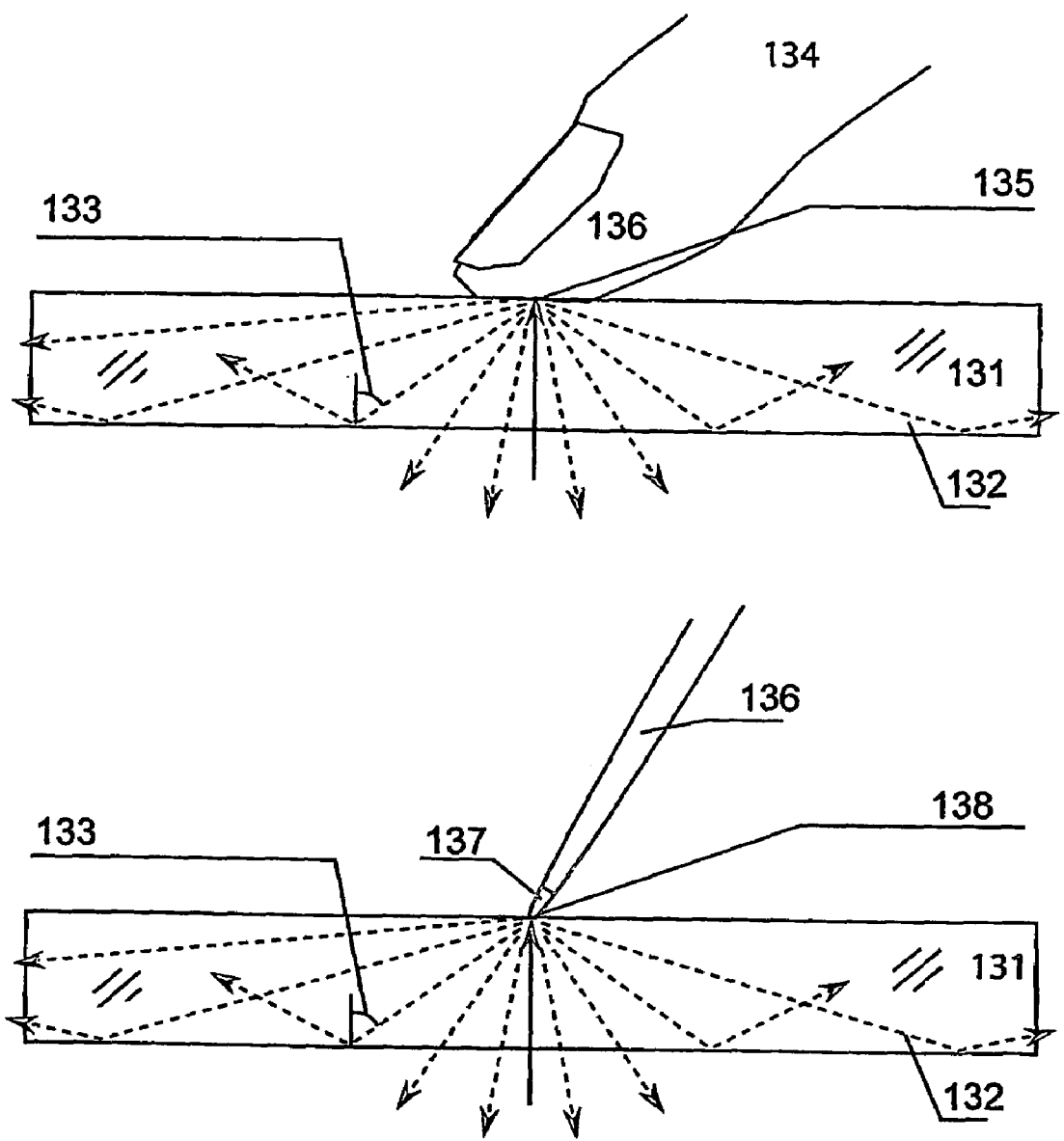
FIG. 13 illustrates particulars relating to reflection into a material.

Touch Characteristics FIG. 13

A finger 134 has changeable scattering effect, light absorption, reflective properties and refractive index because these properties are formed from a complex mix of several different materials present in or at the skin of the finger.

Furthermore, the properties vary with the wavelength with a peak around 630 nm to 700 nm concerning reflective properties, where the finger is able to reflect approximately 1.7% of 90 degrees incident light. The reflection varies very little across different skin colouration. The reflection from the upper part of the hand is in the approximately 656 nm wavelength lower on the upper side of the hand than on the palm and finger palms. This effect can be used to separate weaker large area points of touch from smaller points of touch with higher light intensity. Dry fingers have a refractive index close to 1.5.

Dirt, grease and/or moist on finger can make the refractive index change to between approx. 1.5 and 1.3. Empirical research shows that the point of touch reflectance as seen from inside the light transmissive means is also dependent on the applied finger pressure which increases both the contact area and removes air so that the optical contact is improved.

Generally, the light scattered from a finger propagates through total internal reflection in angles between the critical angle defined by the air to screen surface refractive index difference which is approximately 45 degrees for PMMA with refractive index 1.5 at 656 nm to 89 degrees defined by the refractive index difference from PMMA to a dry finger at up to 1.5. A pen point can, however, be controlled very precisely concerning geometry, refractive index and Lambert reflection. A perfectly rounded stylus point made out of a diffusive material with Lambertian properties and having a refractive index above the light transmissive screen surface will insert light into the light transmissive member in angles ranging from the critical angle between air and PMMA, which is approximately 45 degrees to 89 degrees.

The invention claimed is:

1. A system for determining a position of an element emitting/reflecting electromagnetic radiation, the emitting/reflecting element contacts a radiation transmissive element and emits/reflects radiation into the radiation transmissive element, the system comprising:
    an at least one-dimensional detector having a row of a plurality of individual elements each being adapted to detect radiation and to provide a corresponding signal,
    a first elongated radiation transforming element provided on a surface of the radiation transmissive element so that radiation from the emitting/reflecting element travels inside the radiation transmissive element on a radiation path from the emitting/reflecting element to the detector, the first radiation transforming element being arranged in the radiation path and being adapted to modulate electromagnetic radiation from the emitting/reflecting element so as to form a modulated radiation intensity pattern on a row of the detector, and a determining element adapted to determine, on the basis of the intensity pattern detected by the detector, a position of the emitting/reflecting element.

2. A system according to claim 1, wherein the determining element is adapted to determine a first value related to a distance, on the detector, between at least two predetermined parts of the intensity pattern and adapted to determine the position of the emitting/reflecting element on the basis of the first value.

3. A system according to claim 2, wherein the determining element is adapted to determine one or more second value(s) related to a position, on the detector, of one or more predetermined part(s) of the intensity pattern and adapted to determine the position of the emitting/reflecting element on the basis of the second value(s).

4. A system according to claim 1, wherein the determining element is adapted to determine a position, on the detector, of one or more of a plurality of predetermined parts of the intensity pattern by:
   identifying the plurality of predetermined parts of the intensity pattern,
   deriving, from the signals from the elements of the detector having detected the individual parts of the intensity pattern, information relating to a shape of the parts of the intensity pattern, and
   deriving the position(s) by fitting the shape information to the parts of the intensity pattern.

5. A system according to claim 1, wherein the determining element is adapted to determine a position, on the detector, of one or more of a plurality of predetermined parts of the intensity pattern by:
   identifying the plurality of predetermined parts of the intensity pattern,
   predetermining a shape of each of the parts of the intensity pattern, and
   deriving the position(s) by fitting the predetermined shape to the parts of the intensity pattern.

6. A system according to claim 1, wherein the first radiation transforming element comprises, along its longitudinal direction, an element for reflecting/reducing/absorbing/extinguishing incident electromagnetic information and for transmitting electromagnetic information, having the intensity pattern, toward the detector.

7. A system according to claim 6, wherein the reflecting/reducing/absorbing/extinguishing element is provided in a periodic pattern along the longitudinal direction.

8. A system according to claim 6, wherein the reflecting/reducing/absorbing/extinguishing element is adapted to substantially prevent transmission of electromagnetic radiation therethrough.

9. A system according to claim 6, wherein the first radiation transforming element has its longitudinal axis at an angle to an axis of extension of the detecting elements of the detector.

10. A system according to claim 1, wherein the detector comprises two or more at least one-dimensional detectors, and the system comprises a second radiation transforming element, where electromagnetic radiation transmitted through the first radiation transforming element is incident on one detector and electromagnetic radiation transmitted through the second radiation transforming element is incident on another detector.

11. A system according to claim 10, wherein the first radiation transforming element is adapted to provide radiation that is modulated thereby with a first characteristic, and the second radiation transforming element is adapted to provide radiation that is modulated thereby with a second characteristic, where a first detector is able to detect the first characteristic of radiation and the second characteristic of no radiation, and a second detector is able to detect the second characteristic of radiation and the first characteristic of no radiation.

12. A system according to claim 1, wherein the detector comprises a number of co-extending rows of individual elements, and the first radiation transforming element comprises an element for providing a plurality of radiation lines across the plurality of rows, the radiation lines having a non-perpendicular angle to a direction of the rows.

13. A system according to claim 1, further comprising a second radiation transforming element positioned between the first radiation transforming element and the emitting/reflecting element and being adapted to form a modulated intensity pattern on the first radiation transforming element, the first radiation transforming element further modulates the radiation and provides the modulated radiation on the detector.

14. A system according to claim 13, wherein the system is adapted to receive radiation from the emitting/reflecting element at a first position or area between the first radiation transforming element and the second radiation transforming element and at a second position or area on an opposite side of the second radiation transforming element.

15. A system according to claim 13, wherein the first radiation transforming element and the second radiation transforming element are at least substantially straight elements, and a non-zero angle exists between the elements.

16. A system according to claim 1, wherein the first radiation transforming element is curved.

17. A system according to claim 16, wherein the first radiation transforming element is curved in a direction away from or toward the detector.

18. A system according to claim 13, wherein the first radiation transforming element and the second radiation transforming element are curved, each having a center of curvature, and the centers of curvature are different.

19. A system according to claim 16, further comprising a lens positioned between the first radiation transforming element and the detector.

20. A system according to claim 19, wherein the first radiation transforming element is provided on a surface of the lens.

21. A system according to claim 1, wherein the first radiation transforming element is provided by printing a predetermined pattern on the surface.

22. A system according to claim 1, wherein the emitting/reflecting element is adapted to reflect radiation from a radiation provider toward the first radiation transforming element, the radiation provider being adapted to provide spatially modulated radiation toward the emitting/reflecting element.

23. A method of determining a position of an element emitting/reflecting electromagnetic radiation, the emitting/reflecting element contacts a radiation transmissive element and emits/reflects radiation into the radiation transmissive element, and part of the radiation traveling inside the radiation transmissive element to a first elongated radiation transforming element provided on a side of the radiation transmissive element, the method comprising:
   modulating the part of the radiation in the first radiation transforming element, so as to form a modulated radiation intensity pattern,
   detecting the modulated radiation intensity pattern with an at least one-dimensional detector having a row with a plurality of individual elements each detecting a separate part of the intensity pattern and providing a corresponding signal, and determining, on the basis of the intensity pattern detected by the detector, the position of the emitting/reflecting element.

24. A method according to claim 23, wherein the determining step further comprises determining a first value related to a distance, on the detector, between at least two predetermined parts of the intensity pattern and determining the position of the emitting/reflecting element on the basis of the first value.

25. A method according to claim 23, wherein the determining step further comprises determining one or more second value(s) related to a position, on the detector, of one or more predetermined part(s) of the intensity pattern and determining the position of the emitting/reflecting element on the basis of the second value(s).

26. A method according to claim 23, wherein the determining step further comprises determining a position, on the detector, of one or more of a plurality of predetermined parts of the intensity pattern by:
   identifying the plurality of predetermined parts of the intensity pattern,
   deriving, from the signals from the elements of the detector having detected the individual parts of the intensity pattern, information relating to a shape of the parts of the intensity pattern, and
   deriving the position(s) by fitting the shape information to the parts of the intensity pattern.

27. A method according to claim 23, wherein the determining step further comprises determining a position, on the detector, of one or more of a plurality of predetermined parts of the intensity pattern by:
   identifying the plurality of predetermined parts of the intensity pattern,
   predetermining a shape of the parts of the intensity pattern, and
   deriving the position(s) by fitting the predetermined shape to the parts of the intensity pattern.

28. A method according to claim 23, further comprising reflecting/reducing/absorbing/extinguishing electromagnetic radiation incident on the first radiation transforming element and transmitting electromagnetic information, having the intensity pattern, toward the detector.

29. A method according to claim 28, wherein the reflecting/reducing/absorbing/extinguishing step comprises reflecting/reducing/absorbing/extinguishing the radiation using a periodic pattern of one or more radiation reflecting/reducing/absorbing/extinguishing material(s) along a longitudinal direction.

30. A method according to claim 28, wherein the reflecting/reducing/absorbing/extinguishing step comprises substantially preventing transmission of electromagnetic radiation through the first radiation transforming element at one or more positions along a longitudinal direction thereof.

31. A method according to claim 28, wherein the first radiation transforming element has its longitudinal axis at an angle to an axis of extension of the detecting elements of the detector.

32. A method according to claim 23, wherein the detector comprises two or more at least one-dimensional detectors and a second radiation transforming element, the modulation step includes the first transforming element transmitting modulated electromagnetic radiation onto one detector and the second radiation transforming element transmits modulated electromagnetic radiation onto another detector.

33. A method according to claim 32, wherein the first radiation transforming element provides radiation that is modulated thereby with a first characteristic, and the second radiation transforming element provides radiation that is modulated thereby with a second characteristic, where a first detector detects the first characteristic of radiation and the second characteristic of no radiation, and a second detector detects the second characteristic of radiation and the first characteristic of no radiation.

34. A method according to claim 23, wherein the detector comprises a number of co-extending rows of individual elements, and the modulating step comprises an element to provide a plurality of radiation lines across the plurality of rows, the radiation lines having a non-perpendicular angle to a direction of the rows.

35. A method according to claim 23, wherein the modulating step further comprises a second radiation transforming element modulating the radiation from the emitting/reflecting element and providing the modulated radiation on the first radiation transforming element, the first radiation transforming element further modulates the radiation and provides the modulated radiation on the detector.

36. A method according to claim 35, further comprising receiving radiation from the emitting/reflecting element at a first position or area between the first radiation transforming element and the second radiation transforming element and the step of receiving radiation from a second position or area on an opposite side of the second radiation transforming element.

37. A method according to claim 35, wherein the first radiation transforming element and the second radiation transforming element are at least substantially straight elements, and a non-zero angle exists between the elements.

38. A method according to claim 23, wherein the first radiation transforming element is curved.

39. A method according to claim 38, wherein the first radiation transforming element is curved in a direction away from or toward the detector.

40. A method according to claim 35, wherein the first radiation transforming element and the second radiation transforming element are curved each having a center of curvature, where the centers of curvature are different.

41. A method according to claim 38, further comprising a lens means providing the radiation modulated by the first radiation transforming element to the detector.

42. A method according to claim 41, wherein the first radiation transforming element is provided on a surface of the lens means.

43. A method according to claims 23, further comprising the step of providing the first radiation transforming element by printing a predetermined pattern on the surface.

44. A method according to claim 23, wherein the emitting/reflecting element reflects radiation from a radiation provider toward the first radiation transforming element, the radiation provider provides spatially modulated radiation toward the emitting/reflecting element.

* * * * *

UNITED STATES PATENT AND TRADEMARK OFFICE
CERTIFICATE OF CORRECTION

PATENT NO. : 7,435,940 B2
APPLICATION NO. : 10/548664
DATED : October 14, 2008
INVENTOR(S) : Jonas Ove Philip Eliasson et al.

Page 1 of 1

It is certified that error appears in the above-identified patent and that said Letters Patent is hereby corrected as shown below:

On the Title page, add

(60) Related U.S. Application Data;

Provisional Application No. 60/502,244, filed on September 12, 2003.

Signed and Sealed this

Twenty-fourth Day of February, 2009

JOHN DOLL
*Acting Director of the United States Patent and Trademark Office*